(12) United States Patent
O'Brien et al.

(10) Patent No.: US 7,423,522 B2
(45) Date of Patent: Sep. 9, 2008

(54) TIRE PRESSURE ALERT SYSTEM

(75) Inventors: Frank O'Brien, Holland, MI (US); Niall R. Lynam, Holland, MI (US); Kenneth Schofield, Holland, MI (US)

(73) Assignee: Donnelly Corporation, Holland, MI (US)

( * ) Notice: Subject to any disclaimer, the term of this patent is extended or adjusted under 35 U.S.C. 154(b) by 191 days.

(21) Appl. No.: 11/232,324

(22) Filed: Sep. 21, 2005

(65) Prior Publication Data

US 2006/0071766 A1 Apr. 6, 2006

Related U.S. Application Data

(63) Continuation-in-part of application No. 11/935,800, filed on Nov. 6, 2007, which is a continuation of application No. 11/624,381, filed on Jan. 18, 2007, which is a continuation of application No. 10/645,762, filed on Aug. 20, 2003, now Pat. No. 7,167,796, which is a continuation-in-part of application No. 10/456,599, filed on Jun. 6, 2003, now Pat. No. 7,004,593, said application No. 10/645,762 is a continuation-in-part of application No. 10/287,178, filed on Nov. 4, 2002, now Pat. No. 6,678,614, which is a continuation of application No. 09/799,414, filed on Mar. 5, 2001, now Pat. No. 6,477,464, said application No. 11/624,381 is a continuation-in-part of application No. 10/755,915, filed on Jan. 13, 2004, which is a continuation of application No. 09/793,002, filed on Feb. 26, 2001, now Pat. No. 6,690,268, said application No. 11/624,381 is a continuation-in-part of application No. 10/054,633, filed on Jan. 22, 2002, now Pat. No. 7,195,381.

(60) Provisional application No. 60/611,796, filed on Sep. 21, 2004, provisional application No. 60/406,166, filed on Aug. 27, 2002, provisional application No. 60/405,392, filed on Aug. 23, 2002, provisional application No. 60/404,906, filed on Aug. 21, 2002, provisional application No. 60/187,960, filed on Mar. 9, 2000, provisional application No. 60/263,680, filed on Jan. 23, 2001, provisional application No. 60/243,986, filed on Oct. 27, 2000, provisional application No. 60/238,483, filed on Oct. 6, 2000, provisional application No. 60/237,077, filed on Sep. 30, 2000, provisional application No. 60/234,412, filed on Sep. 21, 2000, provisional application No. 60/218,336, filed on Jul. 14, 2000, provisional application No. 60/186,520, filed on Mar. 2, 2000, provisional application No. 60/346,733, filed on Jan. 7, 2002, provisional application No. 60/263,680, filed on Jan. 23, 2001, provisional application No. 60/271,466, filed on Feb. 26, 2001, provisional application No. 60/315,384, filed on Aug. 28, 2001.

(51) Int. Cl.
*B60R 25/10* (2006.01)

(52) U.S. Cl. ............... 340/426.33; 359/265; 359/876; 359/604; 359/871; 362/494; 250/214 C; 701/213

(58) Field of Classification Search ............ 340/426.33, 340/442, 539.17; 359/839
See application file for complete search history.

(56) References Cited

U.S. PATENT DOCUMENTS

| | | |
|---|---|---|
| 4,065,750 A | 12/1977 | Duncan et al. |
| 4,274,078 A | 6/1981 | Isobe et al. |
| 4,646,673 A | 3/1987 | Fordyce |
| 4,862,594 A | 9/1989 | Schierbeek et al. |
| 4,895,097 A | 1/1990 | Lechnir |
| 4,937,945 A | 7/1990 | Schofield et al. |
| 5,131,154 A | 7/1992 | Schierbeek et al. |
| 5,255,442 A | 10/1993 | Schierbeek et al. |
| 5,371,659 A | 12/1994 | Pastrick et al. |
| 5,469,298 A | 11/1995 | Suman et al. |
| 5,488,352 A | 1/1996 | Jasper |
| 5,497,306 A | 3/1996 | Pastrick |
| 5,632,092 A | 5/1997 | Blank et al. |
| 5,654,686 A | 8/1997 | Geschke et al. |
| 5,668,663 A | 9/1997 | Varaprasad et al. |
| 5,669,705 A | 9/1997 | Pastrick et al. |
| 5,724,187 A | 3/1998 | Varaprasad et al. |
| 5,774,283 A | 6/1998 | Nagel et al. |

| | | | |
|---|---|---|---|
| 5,786,772 A | 7/1998 | Schofield et al. | |
| 5,798,688 A | 8/1998 | Schofield | |
| 5,835,255 A | 11/1998 | Miles | |
| 5,837,891 A | 11/1998 | Bridge | |
| 5,863,116 A | 1/1999 | Pastrick et al. | |
| 5,924,212 A | 7/1999 | Domanski | |
| 5,926,087 A | 7/1999 | Busch et al. | |
| 5,971,552 A | 10/1999 | O'Farrell et al. | |
| 5,986,796 A | 11/1999 | Miles | |
| 6,006,159 A | 12/1999 | Schmier et al. | |
| 6,028,537 A | 2/2000 | Suman et al. | |
| 6,087,942 A | 7/2000 | Sleichter, III et al. | |
| 6,100,798 A | 8/2000 | Liang | |
| 6,124,647 A | 9/2000 | Marcus et al. | |
| 6,166,698 A | 12/2000 | Turnbull et al. | |
| 6,176,602 B1 | 1/2001 | Pastrick et al. | |
| 6,207,967 B1 | 3/2001 | Hochstein | |
| 6,229,434 B1 | 5/2001 | Knapp et al. | |
| 6,243,003 B1 | 6/2001 | DeLine et al. | |
| 6,276,821 B1 | 8/2001 | Pastrick et al. | |
| 6,278,377 B1 | 8/2001 | DeLine et al. | |
| 6,294,989 B1 | 9/2001 | Schofield et al. | |
| 6,296,379 B1 | 10/2001 | Pastrick | |
| 6,326,613 B1 | 12/2001 | Heslin et al. | |
| 6,329,925 B1 | 12/2001 | Skiver et al. | |
| 6,420,975 B1 | 7/2002 | DeLine et al. | |
| 6,428,172 B1 | 8/2002 | Hutzel et al. | |
| 6,445,287 B1 | 9/2002 | Schofield et al. | |
| 6,472,979 B2 | 10/2002 | Schofield et al. | |
| 6,477,464 B2 | 11/2002 | McCarthy et al. | |
| 6,572,233 B1 * | 6/2003 | Northman et al. | 359/839 |
| 6,574,033 B1 | 6/2003 | Chui et al. | |
| 6,589,625 B1 | 7/2003 | Kothari et al. | |
| 6,650,233 B2 | 11/2003 | DeLine et al. | |
| 6,650,455 B2 | 11/2003 | Miles | |
| 6,674,562 B1 | 1/2004 | Miles | |
| 6,678,614 B2 | 1/2004 | McCarthy et al. | |
| 6,680,792 B2 | 1/2004 | Miles | |
| 6,690,268 B2 | 2/2004 | Schofield et al. | |
| 6,710,908 B2 | 3/2004 | Miles et al. | |
| 6,717,524 B2 | 4/2004 | DeLine et al. | |
| 6,731,205 B2 | 5/2004 | Schofield et al. | |
| 6,741,377 B2 | 5/2004 | Miles | |
| 6,794,119 B2 | 9/2004 | Miles | |
| 6,847,487 B2 | 1/2005 | Burgner | |
| 6,943,674 B2 * | 9/2005 | Tsai | 340/442 |
| 7,004,593 B2 | 2/2006 | Weller et al. | |
| 7,046,448 B2 | 5/2006 | Burgner | |
| 7,092,804 B2 * | 8/2006 | McQuade et al. | 701/29 |
| 2002/0075240 A1 | 6/2002 | Lieberman et al. | |
| 2004/0128065 A1 | 7/2004 | Taylor et al. | |
| 2005/0090275 A1 * | 4/2005 | Wang | 455/512 |
| 2005/0134983 A1 | 6/2005 | Lynam | |
| 2005/0232469 A1 | 10/2005 | Schofield et al. | |
| 2006/0061008 A1 | 3/2006 | Karner et al. | |

* cited by examiner

*Primary Examiner*—Davetta W. Goins
*Assistant Examiner*—Ojiako Nwugo
(74) *Attorney, Agent, or Firm*—Van Dyke, Gardner, Linn & Burkhart LLP

(57) ABSTRACT

A tire pressure alert system suitable for use in a vehicle includes a vehicular tire pressure monitoring system and a telematic system of the vehicle. The telematic system of the vehicle is operable to wirelessly communicate between the vehicle and an external service provider external to the vehicle. The tire pressure monitoring system is operable to detect or determine or estimate a tire pressure in a tire mounted on a wheel of the vehicle and to communicate an output signal indicative of the tire pressure to the external service provider. The external service provider receives the output signal from the tire pressure monitoring system and processes the output signal and communicates an alert to the subject vehicle to alert the driver or occupant of the vehicle of a tire pressure condition in one or more of the vehicle's tires.

27 Claims, 3 Drawing Sheets

TIRE PRESSURE ALERT SYSTEM

CROSS REFERENCE TO RELATED APPLICATION

The present application claims the benefit of U.S. provisional application, Ser. No. 60/611,796, filed Sep. 21, 2004, which is hereby incorporated herein by reference in its entirety; and the present application is a continuation-in-part of U.S. patent application Ser. No. 11/935,800, filed Nov. 6, 2007, which is a continuation of U.S. patent application Ser. No. 11/624,381, filed Jan. 18, 2007, which is a continuation of U.S. patent application Ser. No. 10/645,762, filed Aug. 20, 2003, now U.S. Pat. No. 7,167,796, which claims the benefit of U.S. provisional applications, Ser. No. 60/406,166, filed Aug. 27, 2002; Ser. No. 60/405,392, filed Aug. 23, 2002; and Ser. No. 60/404,906, filed Aug. 21, 2002; and U.S. patent application Ser. No. 10/645,762 is a continuation-in-part of U.S. patent application Ser. No. 10/456,599, filed Jun. 6, 2003, now U.S. Pat. No. 7,004,593; and U.S. patent application Ser. No. 10/645,762 is a continuation-in-part of U.S. patent application Ser. No. 10/287,178, filed Nov. 4, 2002, now U.S. Pat. No. 6,678,614, which is a continuation of U.S. patent application Ser. No. 09/799,414, filed Mar. 5, 2001, now U.S. Pat. No. 6,477,464, which claims benefit of U.S. provisional application, Ser. No. 60/187,960, filed Mar. 9, 2000; and U.S. patent application Ser. No. 11/624,381 is a continuation-in-part of U.S. patent application Ser. No. 10/755,915, filed Jan. 13, 2004, which is a continuation of U.S. patent application Ser. No. 09/793,002, filed Feb. 26, 2001, now U.S. Pat. No. 6,690,268, which claims benefit of U.S. provisional applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sept. 30, 2000; Ser. No. 60/234,412, filed Sep. 21, 2000; Ser. No. 60/218,336, filed Jul. 14, 2000; and Ser. No. 60/186,520, filed Mar. 2, 2000; and U.S. patent application Ser. No. 11/624,381 is a continuation-in-part of U.S. patent application Ser. No. 10/054,633, filed Jan. 22, 2002, now U.S. Pat. No. 7,195,381, which claims benefit of U.S. provisional applications, Ser. No. 60/346,733, filed Jan. 7, 2002; Ser. No. 60/263,680, filed Jan. 23, 2001; Ser. No. 60/271,466, filed Feb. 26, 2001; and Ser. No. 60/315,384, filed Aug. 28, 2001, and which is a continuation-in-part of U.S. patent application Ser. No. 09/793,002, now U.S. Pat. No. 6,690,268.

FIELD OF THE INVENTION

The present invention relates to tire pressure monitoring systems for vehicles and, more particularly, to a tire pressure monitoring system that periodically displays a tire pressure status or alerts the driver of the vehicle of a low pressure condition in one or more tires of the vehicle.

BACKGROUND OF THE INVENTION

It is known to provide a tire pressure monitoring system for a vehicle to provide an output or alert to a driver or occupant of the vehicle when a low pressure situation occurs in one or more of the vehicle tires. Such systems often include a pressure sensor in each tire that broadcasts a signal to a control in the vehicle. The control may process the signal and generate a signal to a display for displaying or actuating a display of an icon that indicates to the driver or occupant that a low pressure condition exists. For reasons of economy, such alerts are typically shown iconistically, with no physical, numerical readout of the tire pressure.

Such tire pressure monitoring systems are regulated by the National Highway Traffic Safety Administration (NHTSA), such as by 49 CFR Section 571.138, which is hereby incorporated herein by reference. The regulations mandate that the icon or display comes on or appears if a significant under-inflation situation occurs, such as when one or more tires has a pressure of less than 25 percent of the manufacturer's cold inflation pressure. The icon may be initially flashed upon detection of the under-inflation condition and/or upon startup of the vehicle when such an under-inflation condition exists, and may be continuously illuminated after a period of time of flashing.

SUMMARY OF THE INVENTION

The present invention provides a tire pressure alert system that includes a tire pressure monitoring system that is operable in conjunction with a telematic system of the vehicle. The tire pressure monitoring system may detect the pressure in the tires of the vehicle and may communicate the pressure data to a remote or external control or base or center of a telematic system, such as ONSTAR™, TELEAID®, RESCU® or the like, where the data may be processed. The external telematic center may communicate an alert signal or status signal to the vehicle to alert the driver of a low pressure condition or other pressure conditions of the vehicle tires.

According to an aspect of the present invention, a tire pressure alert system suitable for use in a vehicle includes a vehicular tire pressure monitoring system and a telematic system of the vehicle. The telematic system of the vehicle is operable to wirelessly communicate between the vehicle and an external service provider external to the vehicle. The tire pressure monitoring system is operable to detect or determine or estimate a tire pressure in a tire mounted on a wheel of the vehicle and to communicate an output signal indicative of the tire pressure to the external service provider. The external service provider receives the output signal from the tire pressure monitoring system and processes the output signal and communicates an alert to the subject vehicle to alert the driver or occupant of the vehicle of a tire pressure condition.

The tire pressure monitoring system may include a pressure sensor at each tire and a control operable to receive signals from the pressure sensor and to communicate the output signal to the external service provider. The control may communicate the output signal to the external service provider when a communication link is established between the vehicle and the external service provider, such as when a user actuates the telematic system via actuating a user input or button in the vehicle, or when the ignition of the vehicle is started, or the like.

The external service provider may communicate the alert or alert signal to the vehicle via a voice or verbal communication from the external service provider to the vehicle, or via a wireless transmission of a signal to the vehicle, such as to a control or controller of the vehicle that is operable to generate an output signal in response to receiving the wireless transmission of the signal. The control may control or drive an audible alert device, such as a speaker or the like, or may control or drive a visual alert device, such as an iconistic display, a text message, a video screen or the like. The external service provider may communicate the tire pressure detected in one or more of the vehicle tires to the driver of the vehicle, such as via a voice communication from an operator at the external service provider or via an alert signal to the control of the vehicle.

According to another aspect of the present invention, a tire pressure alert system suitable for use in a vehicle includes a vehicular tire pressure monitoring system and a telematic system of the vehicle. The telematic system is operable to wirelessly communicate between the vehicle and an external service provider external to the vehicle. The tire pressure monitoring system is operable to detect or determine or estimate a first tire pressure in a first tire mounted on a first wheel of the vehicle, a second tire pressure in a second tire mounted on a second wheel of the vehicle, a third tire pressure in a third tire mounted on a third wheel of the vehicle, and a fourth tire pressure in a fourth tire mounted on a fourth wheel of the vehicle. The tire pressure monitoring system is operable to communicate an output signal indicative of the first, second, third and fourth fire pressures to the external service provider, which receives the output signal from the tire pressure monitoring system and processes the output signal and communicates an alert to the subject vehicle to alert the driver or occupant of the vehicle of a tire pressure condition.

According to another aspect of the present invention, a tire pressure alert system suitable for use in a vehicle includes a vehicular tire pressure monitoring system, a telematic system of the vehicle that is operable to wirelessly communicate between the vehicle and an external service provider external to the vehicle, and a visual alert device operable to display a visible alert that is viewable by a driver of the vehicle. The tire pressure monitoring system is operable to detect or determine or estimate a tire pressure in a tire mounted on a wheel of the vehicle and to communicate an output signal indicative of the tire pressure to the external service provider. The external service provider receives the output signal from the tire pressure monitoring system and processes the output signal and communicates an alert signal indicative of a tire pressure condition to the visual alert device, whereby the visual alert device is operable to alert the driver or occupant of the vehicle of a tire pressure condition.

Optionally, the visual alert device may be incorporated in an interior rearview mirror assembly of the vehicle, where the visible display is viewable by the driver of the vehicle through a mirror reflective element of the interior rearview mirror assembly. Optionally, the visual alert device may comprise at least one laser diode operable to emit radiation, whereby the laser diode is rastered over a display area to provide a viewable display that is viewable and discernible by the driver of the vehicle. Optionally, the laser diode may be positioned within a mirror casing of the interior rearview mirror assembly and behind a transflective reflective element of the interior rearview mirror assembly. The laser diode may be operable to emit radiation onto a reflector within the mirror casing that reflects the radiation toward and through the reflective element for viewing by the driver of the vehicle.

Therefore, the present invention provides a tire pressure alert system that utilizes the telematic system of the vehicle to process tire pressure data from a tire pressure monitoring system of the vehicle and to alert the driver or occupant of the vehicle as to the tire pressure status. The intelligence necessary to analyze and decipher the sensed pressure values is thus external to the vehicle, so that economy is achieved by reducing the electronic content and capabilities of the circuitry and controls within the vehicle.

These and other objects, advantages, purposes and features of the present invention will become apparent upon review of the following specification in conjunction with the drawings.

DESCRIPTION OF THE PREFERRED EMBODIMENTS

Figure 1:
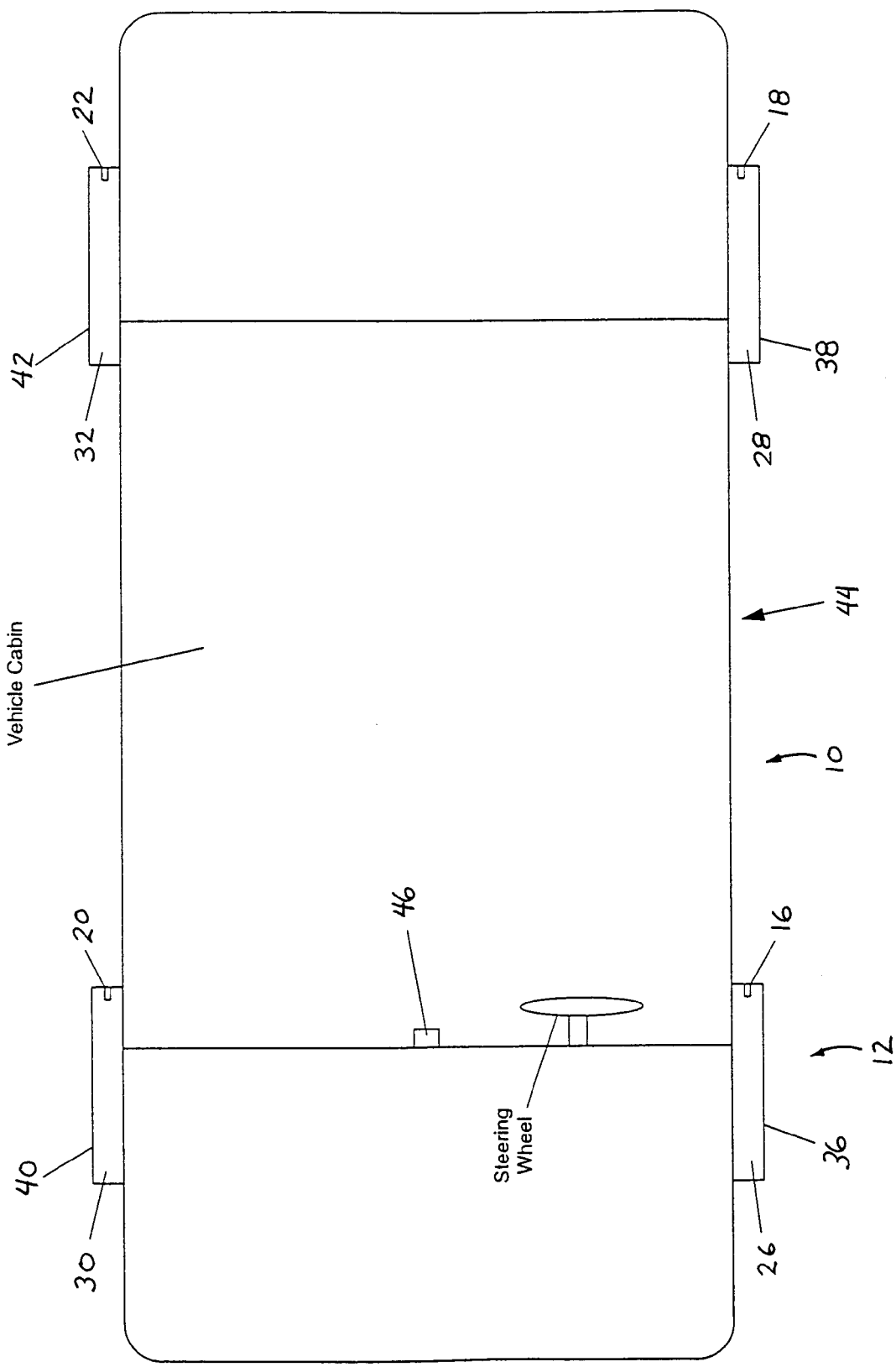
FIG. 1 is a block diagram of a tire pressure monitoring system suitable for use with the present invention.
Figure 2:
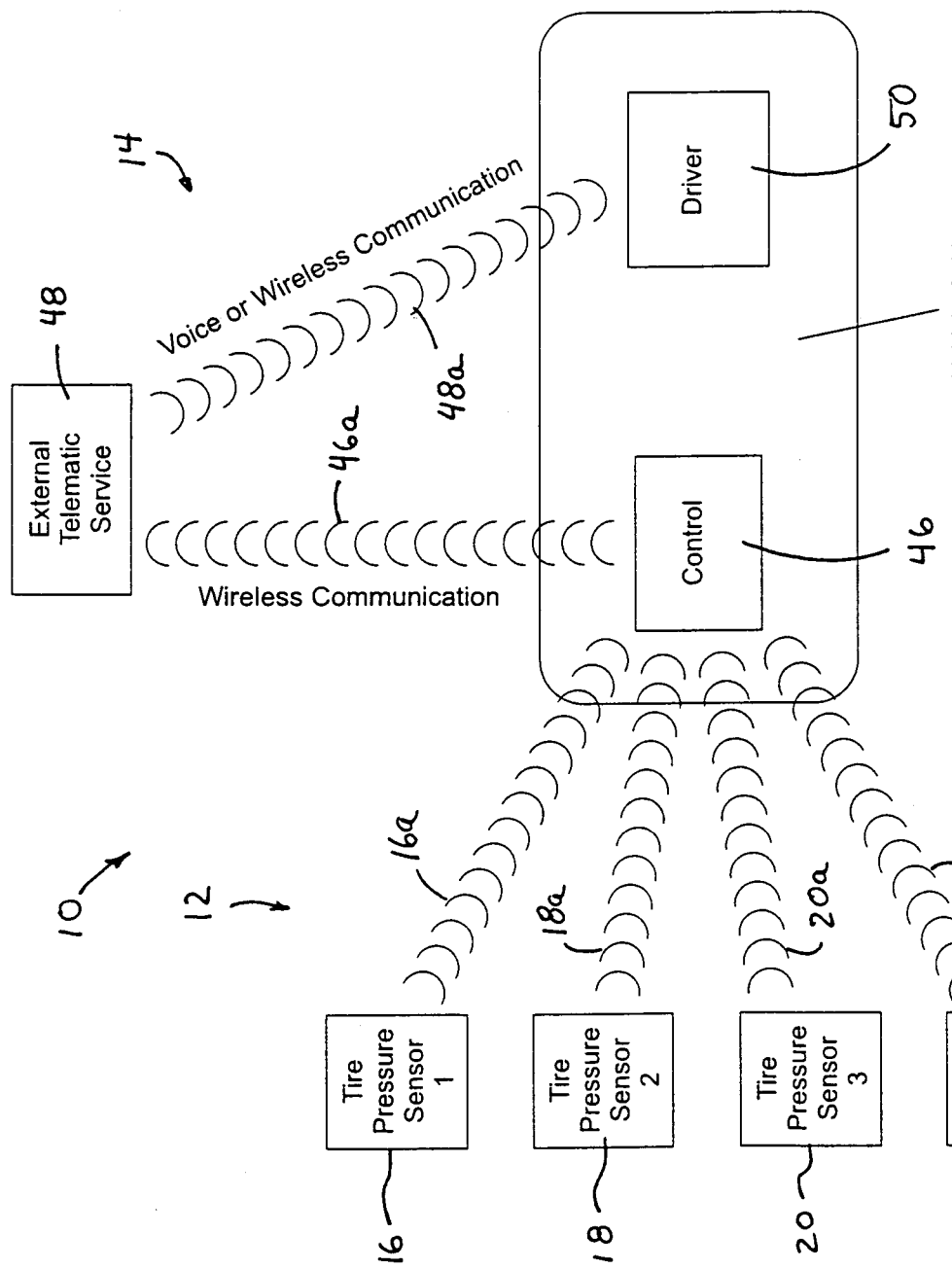
FIG. 2 is a block diagram of the tire pressure alert system of the present invention.

Referring now to the drawings and the illustrative embodiments depicted therein, a tire pressure alert system or monitoring and display system 10 includes a tire pressure monitoring system 12 and a telematic system 14 (FIGS. 1 and 2). In the illustrated embodiment, tire pressure monitoring system 12 includes a sensor 16, 18, 20, 22 (such as a tire pressure sensor) at each tire 26, 28, 30, 32 mounted at each wheel 36, 38, 40, 42 of a vehicle 44 (FIG. 1). The tire pressure sensors 16, 18, 20, 22 provide output signals 16a, 18a, 20a, 22a to a control 46. The control 46 may communicate a signal 46a indicative of the pressure data to an external telematic service or center or base or service provider 48 of the telematic system 14, and the external telematic center 48 may communicate a signal 48a to a control or controller or processor 50 of the vehicle, as discussed below. The control 50 may generate an alert or the like to the driver or occupant of the vehicle in response to the signal from the telematic center to alert the driver of an inflation status or under-inflation condition of the tires of the vehicle, as also discussed below. The system thus may communicate tire pressure information to an occupant of the vehicle via communications between the vehicle controls and an external telematic system.

The tire pressure sensors 16, 18, 20, 22 may be respectively located in a tire 26 mounted at the driver-side front wheel 36, a tire 28 mounted at the driver-side rear wheel 38, a tire 30 mounted at the passenger-side front wheel 40, and a tire 32 mounted at the passenger-side rear wheel 42 on vehicle 44. Such sensors include a pressure transducer capable of measuring tire inflation pressure, and preferably include a transmitter (such as a radio frequency (RF) transmitter or the like) for wireless communication of this data to control 46, which may be located in the interior of the vehicle. Tire pressure sensors 16, 18, 20, 22 provide an actual measured pressure output for the actual measured tire pressure in the respective tires to the control 46.

The tire pressure monitoring system may utilize aspects of tire pressure monitoring systems of the types described in U.S. Pat. Nos. 6,731,205; 6,294,989; 6,124,647; 6,445,287; and/or 6,472,979, which are hereby incorporated herein by reference. Optionally, the tire pressure monitoring system may comprise a self training tire pressure monitoring system which is operable to determine the pressure of each tire of the vehicle and the particular location or wheel of the vehicle at which each of the tires is mounted or located, such as described in U.S. Pat. No. 6,731,205, incorporated above. Optionally, the tire pressure monitoring system may comprise a direct pressure monitoring system utilizing pressure sensors at each fire or an indirect pressure monitoring system utilizing wheel speed sensors and the like to calculate or estimates a change in tire pressure based on individual wheel speeds and rolling radii, without affecting the scope of the present invention.

The term "tire", as used herein, refers to the tire and hub combination or assembly, which is mounted to a wheel of the vehicle. Also, the term "wheel" refers to the particular rotatable portion of the corner assembly or the like of the vehicle. Each wheel includes the lugs or studs extending therefrom (on which the hub and tire is mounted) and may include the rotor or drum of the brake system of the vehicle. The tires and associated sensors may be rotated or moved from one wheel of the vehicle to another, while the wheels remain generally fixedly positioned at the respective corners of the vehicle.

Sensors 16, 18, 20, 22 may be installed by strapping or otherwise attaching the sensors to the hub rim or elsewhere within the pressurized internal volume within the inflated tire, by replacing the tire valve stem with a combined tire valve and sensing module, or by attachment of the sensors to the exterior of the existing tire valve, or by any other means which mounts or positions the sensors at least partially within or in communication with the pressurized chambers of the tires, without affecting the scope of the present invention. Sensors 16, 18, 20, 22 may be battery powered, may use wheel motion to generate power, or may rely on induction from a source mounted on a fixed portion of the vehicle, without affecting the scope of the present invention. Each of the sensors 16, 18, 20, 22 preferably incorporates a pressure transducer, a temperature sensing means, a processor to encode data in a format unique to the module, and a transmitter, such as an RF transmitter or the like.

Control 46 includes an antenna (such as a radio frequency or RF antenna) and a receiver (and preferably a single-receiver) for receiving tire pressure signals wirelessly broadcast from sensors 16, 18, 20, 22 (as shown in FIG. 2). Control 46 is positioned within the interior of the vehicle, and preferably at, within or on an interior mirror assembly or at, within or on an overhead console (not shown) in the interior cabin of the vehicle. The control 46 may receive a generally continuous input from each of the pressure sensors and may generate an output signal indicative of the pressure data.

Control 46 may receive the input signal from the sensors 16, 18, 20, 22 and may generate and transmit an output signal to the external telematic service center 48 of a telematic system 14 of the vehicle. The external telematic service may receive the signal and pressure data and may process the signal and pressure data to determine the tire inflation status or condition of the tires of the vehicle. The external telematic service 48 may then communicate a signal 48a to a control or controller 50 of the vehicle, whereby the control 50 may generate an alert signal to the driver or occupant of the vehicle, as discussed below.

Such a communication/telematic system and service center may be substantially similar to known systems and centers, such as General Motors' ONSTAR®, Daimler's TELEAID™, Ford's RESCU® or the like, which are common in vehicles today. Such telematic systems involve a telecommunication link from the vehicle to an operator or a voice input system at a service center or the like external to the vehicle. The control of the vehicle may connect or communicate with an operator at the service center to request directions to a targeted location or to request roadside assistance or other services, such as concierge service and the like (such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; and/or 6,678,614; and/or U.S. patent applications, Ser. No. 10/456, 599, filed Jun. 6, 2003 by Weller et al. for INTERIOR REARVIEW MIRROR SYSTEM WITH COMPASS, now U.S. Pat. No. 7,004,593; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/422,378, filed Apr. 24, 2003 by Schofield for IMAGING SYSTEM FOR VEHICLE, now U.S. Pat. No. 6,946,978; and/or PCT Application No. PCT/US03/40611, filed Dec. 19, 2003 by Donnelly Corporation et al. for ACCESSORY SYSTEM FOR VEHICLE, and/or PCT Application No. PCT/US03/308877, filed Oct. 1, 2003 by Donnelly Corp. for MICROPHONE SYSTEM FOR VEHICLE, which are all hereby incorporated herein by reference.

The telematic system or wireless communication system 14 of the vehicle may be operable to connect to a corresponding service center 48, such as to an operator or voice input or voice recognition system or the like, which may provide a variety of information or assistance to the driver of the vehicle in response to a vocal message from the driver or other occupant of the vehicle (although the user input may be a keypad input or the like to a computerized service center or the like, without affecting the scope of the present invention). The communication link may be accomplished utilizing various linking principles, such as the principles disclosed in commonly assigned U.S. Pat. Nos. 6,420,975; 6,278,377; 6,243, 003; 6,329,925; 6,428,172; and 6,326,613, and/or U.S. patent application Ser. No. 10/964,512, filed Oct. 13, 2004, now U.S. Pat. No. 7,308,341, the disclosures of which are hereby incorporated herein by reference.

The driver or occupant of the vehicle may actuate a communication link (such as via a push button or the like at the interior rearview mirror or at a console of the vehicle) of the telematic system, and request from the operator, such as via a voice input, desired information or the like, such as the driving instructions or directions as to how to get to a desired or targeted location or destination. When the communication link is established or actuated, the control 46 may automatically upload the tire pressure data or information to the telematic service center (such as via wireless communication signal 46a in FIG. 2). For example, the tire pressure data or information may be uploaded to the center and displayed on a monitor or video display screen or the like to the person or operator at the service center that is speaking with the driver or occupant of the subject vehicle. The operator at the service center may then communicate to the driver or occupant of the subject vehicle (such as via the voice communication signal 48a in FIG. 2) the status of the pressure in the tires. For example, the service center operator may verbally communicate to the driver or occupant of the vehicle that the tire pressure is "ok" or acceptable, or that the tire pressure in one or more tires is low, or what the measured or sensed pressure is in one or more of the vehicle tires (such as, for example, "your left front tire is at 30 p.s.i., which is low"). The signal 48a is communicated to a control or controller 50, which may drive or power or control one or more speakers within the vehicle for communicating audible or voice or verbal signals to the driver or occupant of the vehicle.

Optionally, the communication link or links between the control 46 and the service center 48 may be established or actuated when the ignition is started on the vehicle (or at some other defined time or moment after the ignition starts or at or after some other activating or triggering event, depending on the particular application of the tire pressure alert system), so that the tire pressure data is uploaded to the service center at each onset of driving of the vehicle. The uploaded data may be processed at the service center and an alert signal may be generated and communicated to the subject vehicle if a low pressure condition is detected. For example, an operator at the external service center may call the subject vehicle and verbally alert the driver or occupant of the detected condition, or an automated, prerecorded voice or verbal message may be generated and communicated to the subject vehicle to verbally alert the driver or occupant of the detected condition, or the service center may wirelessly communicate a signal to the control 50 of the vehicle to cause an alert signal (such as an audible signal, such as a chime or the like, or a visual signal)

to be generated at the vehicle, as discussed below. Such a tire pressure alert system may be an optional service provided by the telematic system, and may be selected or requested by the owner of the vehicle when initially setting up the telematic system and related options.

The control may upload the pressure data each time the ignition is activated and/or each time the user actuates the input to establish the communication link with the external service center or provider, or may upload the pressure data periodically, such as once a day or week, without affecting the scope of the present invention. The interval between uploads may be selected or programmed by the vehicle owner or may be established via system design, depending on the particular application and desired features. The control may automatically upload the pressure data at the desired time period or may upload the pressure data at the next time that the communication link is established following expiration of a desired time period.

The remote telematic service center may monitor trends in the tire pressure data received from the control 46, and may provide an early alert to the driver of the vehicle of a low pressure condition. For example, the center may monitor a slow drop or decrease in the tire pressure in one of the vehicle's tires and may provide a communication or alert signal to the vehicle that there is a slow leak in one of the tires and that the driver should have the tire checked before it worsens.

Optionally, the telematic center may electronically and wirelessly communicate data (such as via a wireless communication to the control or controller 50), whereby the control 50 generates an output signal or controls or drives a display or alert device. For example, the control 50 may actuate an audible alert device, such as a speaker or the like, that alerts the driver of the vehicle of a low pressure condition in one or more tires. The audible alert may be provided as one or more pre-recorded voice or vocal or verbal messages, such as "your left front tire pressure is low" or may generate one or more audible signals or tones or chimes to indicate to the driver that one or more tires of the vehicle are at a low pressure.

Optionally, the control 50 may control or actuate a visual alert device, such as a visual display device, to visually display the tire pressure status to the driver or occupant of the vehicle. The display device may display the tire pressure status iconistically or may provide a numerical output or display of the measured or sensed tire pressure at one or more of the vehicle tires. Optionally, the display device may display one or more text messages to be read by the driver to convey the tire pressure status to the driver (such as a flashing or scrolling message or the like, such as "your left front tire pressure is low"). The display device may be positioned within the vehicle and readily viewable by the driver or occupant of the vehicle, such as at an interior rearview mirror assembly of the vehicle, or an accessory module or pod of the vehicle, or an overhead console of the vehicle, or the instrument panel of the vehicle, or a GPS map display screen of the vehicle, or the like. Optionally, the alert system may control the display device to display a first display message (or color of message) when the fire pressure in one of the tires drops to a first threshold pressure and may control or adjust the display device to display a second display message (such as a different color message or a flashing message or the like) when the tire pressure in one of the tires drops below a second, lower threshold pressure.

Therefore, the tire pressure alert system of the present invention transmits tire pressure data or information, such as numerical tire pressure data, to an external service center, such as to an operator or an automatic server or computer server at the external service center. At the external location or center, the operator can view (or the automatic server/computer can process) the tire pressure data, such as the actual or detected numerical pressure values of the tires, on a monitor or screen, and may communicate the tire pressure condition (such as via a numerical display of tire pressure values or an iconistic display or an audible or verbal signal or communication) to the driver or occupant of the vehicle. For example, a front driver's side tire of a vehicle may be at a reduced pressure of about 25 p.s.i. instead of, for example, the desired 35 p.s.i. inflation pressure recommended for safe handling of the vehicle. In other known or conventional fire pressure monitoring systems, all the driver of the vehicle may see is an illuminated icon informing the driver that an out of compliance tire pressure has been detected at one of the four tires being monitored on the vehicle. The driver then must go to a service station, check the inflation in each of the tires, and, upon finding the out of compliance tire (e.g., the front driver's side tire), then inflate the out of compliance tire back to the recommended 35 p.s.i. tire pressure.

By contrast, and in accordance with the present invention, signal information and/or tire pressure data is sent from the control within the vehicle to the external telematic service center. At the external center, a human operator and/or a computer monitor can have displayed/interpreted the actual or detected numerical pressure in a given tire and thus can see that the front driver's side tire is at a low or reduced pressure. The operator or service center may convey this information, including the numerical pressure value at the low or reduced pressure tire, and optionally the numerical pressure value at the other tires as well, to the driver or occupant of the vehicle. This communication may be done via a verbal conversation or communication between the remote telematics operator (or automated computer or the like) and the driver of the subject vehicle. The unique combination of a tire pressure monitoring system and a telematic system enhances the value to the driver of having both systems. If desired, the driver can ask the telematics operator (or voice recognizing/interpreting automated computer) "what is my current tire pressure" in any individual tire or in all of the tires on the vehicle. Therefore, even when the pressure in a tire may be only slightly reduced (such as, for example, reduced to about 32 p.s.i. and thus reduced or deflated from a recommended 35 p.s.i. tire pressure), the driver may be made aware of this condition and can choose to continue driving or to inflate the reduced pressure tire at the next service center to optimize fuel usage and/or to minimize tire wear.

The external telematic center thus may provide voice information or verbal communications to the driver or occupant of the subject vehicle or may provide other audible information or may provide visual display information to the driver or occupant of the vehicle. The verbal communication or audible alert or visual display may include driving instructions, such as route instructions for the driver of the vehicle to follow to get to the nearest service station or the like to fix a leak in the tire or to add air to the tire or the like.

Optionally, the visual display may be provided at a display of the vehicle that is associated with another accessory or device or system. For example, and optionally in conjunction with a navigational system (such as the type described in Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796, which is hereby incorporated herein by reference), the external center may provide turn by turn navigational information, such as on a display screen, to the driver of the vehicle in response to a requested or selected route or destination. The turn by turn navigational information may be provided as a scrolling text or information stream, and the numerical tire pressure information may be provided with the navigational information or video stream of text. The tire pressure information thus may be provided by the external telematic center to the vehicle for displaying the information on a navigational screen or display element or on other information screens or display elements of the vehicle, thereby providing visual tire pressure information without a separate tire pressure display.

The output or instructions thus may be provided to the driver by the control via an audible message or signal, such as via one or more speakers of the vehicle, such as by utilizing principles of audio systems of the types disclosed in commonly assigned U.S. Pat. Nos. 6,717,524; 6,650,233; 6,243,003; 6,278,377; and 6,420,975; and/or PCT Application No. PCT/US03/30877, filed Oct. 1, 2003, and/or U.S. patent application Ser. No. 10/529,715, filed Mar. 30, 2005 by Larson et al. for MICROPHONE SYSTEM FOR VEHICLE, which are hereby incorporated herein by reference, or may be provided via a display, such as in a display of an interior rearview mirror 28, such as a scrolling display of the type disclosed in commonly assigned U.S. Pat. No. 6,477,464, which is hereby incorporated herein by reference, or a transflective or display on demand type display, such as the types disclosed in commonly assigned U.S. Pat. Nos. 6,690,268; 5,668,663 and 5,724,187, and U.S. patent application, Ser. No. 10/054,633, filed Jan. 22, 2002 by Lynam et al. for VEHICULAR LIGHTING SYSTEM, now U.S. Pat. No. 7,195,381, the entire disclosures of which are hereby incorporated herein by reference, or in a display screen or the like at the interior rearview mirror assembly or elsewhere within the vehicle, without affecting the scope of the present invention. Other types of visible displays or locations for such visible displays may be utilized, such as at an accessory module or pod or windshield electronic module, an instrument panel of the vehicle, a console of the vehicle and/or the like, without affecting the scope of the present invention. The visible display may comprise written instructions, icons, or any other characters or symbols or indicia which convey to the driver of the vehicle what the tire pressure condition is of the vehicle's tires. Optionally, the output may comprise a combination of a visible display and an audible message or signal, without affecting the scope of the present invention.

The display may be associated with an accessory or device or system of the vehicle, such as a temperature sensing system or device or a navigational system or a compass system or the like, and may be operable to display a temperature or directional heading or other vehicle status or information to the driver of the vehicle. Optionally, the display may default to display such a vehicle status or information to the driver, whereby when the tire pressure alert system of the present invention detects a low tire pressure at one or more of the vehicle's tires (such as a tire pressure at or below a threshold pressure), the tire pressure alert system may override the accessory display and display an alert to the driver of the vehicle that the tire pressure in one of the vehicle tires is low. The tire pressure alert system may control the display and override the display to indicate or display an initial alert at a first threshold low pressure, such as by indicating that the pressure is low via a text or iconistic display, and may display a different or enhanced alert at a lower or second threshold low pressure, such as by flashing or changing the color of the text or iconistic display or by providing an audible alert or the like, in order to enhance the alert so that the driver is more likely to recognize the alert display when the pressure drops further below the initial threshold pressure. The visual display of the tire pressure alert system thus may be a common or shared display that is shared with or associated with another vehicle status or information accessory or device or system, whereby the display may be overridden or controlled by the tire pressure alert system only when the pressure in one or more of the tires falls below a threshold tire pressure.

As indicated above, a variety of means may be utilized to visually convey the tire pressure information to the driver of the vehicle. For example, and such as described in U.S. Pat. No. 6,477,464, which is hereby incorporated herein by reference, a text display may be provided and/or an iconistic display may be provided, such as a display readable through the interior rearview mirror reflective element itself. In this regard, use of a transflective or display on demand (DOD) type display (such as disclosed in commonly assigned, U.S. patent applications, Ser. No. 11/021,065, filed Dec. 23, 2004 by McCabe et al. for ELECTRO-OPTIC MIRROR CELL, now U.S. Pat. No. 7,255,451; Ser. No. 10/528,269, filed Mar. 17, 2005, now U.S. Pat. No. 7,274,501; and/or Ser. No. 10/993,302, filed Nov. 19, 2004 by Lynam for MIRROR REFLECTIVE ELEMENT FOR A VEHICLE, now U.S. Pat. No. 7,338,177; Ser. No. 10/533,762, filed May 4, 2005, now U.S. Pat. No. 7,184,190; Ser. No. 11/226,628, filed Sep. 14, 2005 by Karner et al. for MOUNTING ASSEMBLY FOR VEHICLE INTERIOR MIRROR; and Ser. No. 10/054,633, filed Jan. 22, 2002 by Lynam et al. for VEHICULAR LIGHTING SYSTEM, now U.S. Pat. No. 7,195,381; and in U.S. Pat. Nos. 6,690,268; 5,668,663 and 5,724,187, the entire disclosures of which are hereby incorporated by reference herein), may be preferred. For example, a video display element or a video display screen or an information display element can be used (such as an elongated alphanumeric/multi-pixel/multi-icon display element and/or such as an LCD display or an emitting display element, such as a multi-pixel electroluminescent display or field emission display or light emitting diode display (organic or inorganic) or the like) which is disposed within the mirror housing of the interior mirror assembly of the vehicle, and located behind the mirror reflective element in the mirror housing, and configured so that the information displayed by the display element (that is positioned to the rear of the reflector of the mirror reflective element) is viewable by the driver through the mirror reflective element. Such a display can be accomplished by partially or wholly removing the reflector in the area of the display or, more preferably, by providing a display on demand type display, whereby the reflective element comprises a transflective element, as discussed below.

Note that other display locations are possible for display of the video image or information display, such as a text message or the like, to the driver or occupant of the vehicle. For example, a video image may be displayed on an LCD video screen of flip-down display (such as is disclosed in U.S. Pat. No. 6,690,268, incorporated above), or on a video screen incorporated into the rearview mirror assembly (such as the type disclosed in PCT Application No. PCT/US03/40611, filed Dec. 19, 2003 by Donnelly Corp. et al. for ACCESSORY SYSTEM FOR VEHICLE, published Jul. 15, 2004 as International Publication No. WO 2004/058540; and/or U.S. provisional applications, Ser. No. 60/630,061, filed Nov. 22, 2004 by Lynam et al. for MIRROR ASSEMBLY WITH VIDEO DISPLAY; Ser. No. 60/667,048, filed Mar. 31, 2005 by Lynam et al. for MIRROR ASSEMBLY WITH VIDEO DISPLAY, which are hereby incorporated herein by reference), or on other video display screens that are selectively movable and/or activatable for viewing by the driver of the vehicle, such as the types described in U.S. patent application Ser. No. 11/226,628, filed Sep. 14, 2005 by Karner et al. for MOUNTING ASSEMBLY FOR VEHICLE INTERIOR MIRROR, which is hereby incorporated herein by reference.

Optionally, for example, a video display located in the front instrument panel can be used, or a video display located in an overhead console (such as an overhead accessory module or system as described in PCT Application No. PCT/US03/40611, filed Dec. 19, 2003 by Donnelly Corp. et al. for ACCESSORY SYSTEM FOR VEHICLE, published Jul. 15, 2004 as International Publication No. WO 2004/058540, which is hereby incorporated herein by reference) can be used, without affecting the scope of the present invention. Alternately, a low cost, multi-pixel display (such as the type disclosed in U.S. patent application Ser. No. 10/418,486, filed Apr. 18, 2003 by McMahon et al. for VEHICLE IMAGING SYSTEM, now U.S. Pat. No. 7,005,974, which is hereby incorporated herein by reference), such as a low cost multi-pixel vacuum fluorescent display, a low cost multi-pixel organic light emitting diode (OLED), a low cost multi-pixel field emission display, or any other or similar multi-pixel light emitting display or the like may be utilized, without affecting the scope of the present invention.

Further, when such a vehicle equipped with a video mirror is also equipped with a side viewing or front viewing or rear viewing sensor vision system (such as by utilizing a radar sensor or an ultrasonic sensor or a camera sensor to monitor an area at or near or adjacent to the vehicle, such as described in U.S. provisional applications, Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; Ser. No. 60/618,686, filed Oct. 14, 2004 by Laubinger for VEHICLE IMAGING SYSTEM; and/or Ser. No. 60/638,687, filed Dec. 23, 2004 by Higgins-Luthman for OBJECT DETECTION SYSTEM FOR VEHICLE, which are hereby incorporated herein by reference), the video screen may automatically extend when such a sensor system detects the presence of an obstacle and/or a human adjacent to the vehicle. Also, the video display screen may extend in conjunction with a trailer-hitch monitoring system (such as the types described in U.S. patent applications, Ser. No. 10/418, 486, filed Apr. 18, 2003 by McMahon et al. for VEHICLE IMAGING SYSTEM; and/or Ser. No. 11/226,628, filed Sep. 14, 2005 by Karner et al. for MOUNTING ASSEMBLY FOR VEHICLE INTERIOR MIRROR, which are hereby incorporated herein by reference) and icons and/or indicia and/or instructions may be created on the video image displayed on the extended video screen of the video mirror to assist or guide the driver to hitch a trailer to the trailer hitch of the vehicle.

Optionally, the display and/or an audible alert device or speaker may be positioned at or in or near the interior rearview mirror assembly of the vehicle. The mirror assembly may comprise a prismatic mirror assembly, such as a prismatic mirror assembly utilizing aspects described in U.S. Pat. Nos. 6,318,870; 5,327,288; 4,948,242; 4,826,289; 4,436,371; and 4,435,042; and PCT Application No. PCT/US04/015424, filed May 18, 2004 by Donnelly Corporation et al. for MIRROR ASSEMBLY FOR VEHICLE; and U.S. patent application, Ser. No. 10/933,842, filed Sep. 3, 2004, now U.S. Pat. No. 7,249,860, which are hereby incorporated herein by reference. Optionally, the prismatic reflective element may comprise a conventional prismatic reflective element or prism or may comprise a prismatic reflective element of the types described in PCT Application No. PCT/US03/29776, filed Sep. 19, 2003 by Donnelly Corp. et al. for MIRROR REFLECTIVE ELEMENT ASSEMBLY; U.S. patent applications, Ser. No. 10/709,434, filed May 5, 2004 by Lynam for MIRROR REFLECTIVE ELEMENT; and Ser. No. 10/993, 302, filed Nov. 19, 2004, now U.S. Pat. No. 7,338,177; and U.S. provisional application, Ser. No. 60/525,952, filed Nov. 26, 2003 by Lynam for MIRROR REFLECTIVE ELEMENT FOR A VEHICLE, which are all hereby incorporated herein by reference, without affecting the scope of the present invention. A variety of mirror accessories and constructions are known in the art, such as those disclosed in U.S. Pat. Nos. 5,555,136; 5,582,383; 5,680,263; 6,227,675; 6,229,319; and 6,315,421 (the entire disclosures of which are hereby incorporated by reference herein), that can benefit from the present invention.

Optionally, the interior rearview mirror assembly may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; and/or 4,712,879, which are hereby incorporated herein by reference, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Washington (1990), which are hereby incorporated by reference herein. The mirror assembly may include one or more displays, such as the types disclosed in U.S. Pat. Nos. 5,530,240 and/or 6,329,925, which are hereby incorporated herein by reference, and/or display-on-demand or transflective type displays, such as the types disclosed in U.S. Pat. Nos. 6,690,268; 5,668,663 and/or 5,724,187, and/or in U.S. patent applications, Ser. No. 11/021,065, filed Dec. 23, 2004 by McCabe et al. for ELECTRO-OPTIC MIRROR CELL, now U.S. Pat. No. 7,255,451; Ser. No. 10/528,269, filed Mar. 17, 2005, now U.S. Pat. No. 7,274,501; and/or Ser. No. 10/993,302, filed Nov. 19, 2004 by Lynam for MIRROR REFLECTIVE ELEMENT FOR A VEHICLE, now U.S. Pat. No. 7,338,177; Ser. No. 10/533,762, filed May 4, 2005, now U.S. Pat. No. 7,184, 190; Ser. No. 10/538,724, filed Jun. 13, 2005 by Hutzel et al. for ACCESSORY SYSTEM FOR VEHICLE; Ser. No. 11/226,628, filed Sep. 14, 2005 by Karner et al. for MOUNTING ASSEMBLY FOR VEHICLE INTERIOR MIRROR; and/or Ser. No. 10/054,633, filed Jan. 22, 2002 by Lynam et al. for VEHICULAR LIGHTING SYSTEM, now U.S. Pat. No. 7,195,381; PCT Application No. PCT/US03/29776, filed Sep. 9, 2003 by Donnelly Corp. et al. for MIRROR REFLECTIVE ELEMENT ASSEMBLY; and/or PCT Application No. PCT/US03/40611, filed Dec. 19, 2003 by Donnelly Corp. et al. for ACCESSORY SYSTEM FOR VEHICLE; and/or U.S. provisional applications, Ser. No. 60/644,903, filed Jan. 19, 2005 by Byers et al. for MIRROR ASSEMBLY WITH HEATER ELEMENT; Ser. No. 60/667,049, filed Mar. 31, 2005 by Byers et al. for MIRROR ASSEMBLY WITH HEATER ELEMENT; Ser. No. 60/681,250, filed May 16, 2005; Ser. No. 60/690,400, filed Jun. 14, 2005; Ser. No. 60/695,149, filed Jun. 29, 2005, which are all hereby incorporated herein by reference.

Optionally, the control and/or alert device may be positioned at or in an accessory module or windshield electronic module of the vehicle, without affecting the scope of the present invention. The accessory module may comprise any type of accessory module or windshield electronics module or console, such as the types described in U.S. patent applications, Ser. No. 10/355,454, filed Jan. 31, 2003 by Schofield et al. for VEHICLE ACCESSORY MODULE, now U.S. Pat. No. 6,824,281; and Ser. No. 10/456,599, filed Jun. 6, 2003 by Weller et al. for INTERIOR REARVIEW MIRROR SYSTEM WITH COMPASS, now U.S. Pat. No. 7,004,593, and/or U.S. Pat. Nos. 6,690,268; 6,250,148; 6,341,523; 6,593,565; and 6,326,613, and/or PCT Application No. PCT/US03/40611, filed Dec. 19, 2003 by Donnelly Corp. et al. for ACCESSORY SYSTEM FOR VEHICLE, which are all hereby incorporated herein by reference.

Optionally, the mirror assembly or accessory module may include one or more user actuatable inputs or input devices or human machine interfaces. For example, the inputs or user interfaces may include buttons, such as are described in U.S. Pat. No. 6,501,387, which is hereby incorporated herein by reference, or that include touch/proximity sensors such as are disclosed in U.S. Pat. Nos. 6,001,486; 6,310,611; 6,320,282; and 6,627,918, and U.S. patent application, Ser. No. 09/817,874, filed Mar. 26, 2001 by Quist et al. for INTERACTIVE AUTOMOTIVE REARVISION SYSTEM, now U.S. Pat. No. 7,224,324, and PCT Application No. PCT/US03/40611, filed Dec. 19, 2003, which are hereby incorporated herein by reference, or that include other types of buttons or switches or other inputs, such as those described in U.S. patent applications, Ser. No. 11/029,695, filed Jan. 5, 2005 by Lindahl et al. for MIRROR ASSEMBLY, now U.S. Pat. No. 7,253,723; Ser. No. 11/226,628, filed Sep. 14, 2005 by Karner et al. for MOUNTING ASSEMBLY FOR VEHICLE INTERIOR MIRROR; and/or Ser. No. 11/140,396, filed May 27, 2005 by Uken et al. for MIRROR ASSEMBLY FOR VEHICLE; and/or PCT Application No. PCT/US2004/015424, filed May 18, 2004 by Donnelly Corp. et al. for MIRROR ASSEMBLY FOR VEHICLE, which are hereby incorporated herein by reference, or that include fabric-made position detectors, such as are disclosed in U.S. Pat. Nos. 6,504,531; 6,501,465; 6,492,980; 6,452,479; 6,437,258; and 6,369,804, which are hereby incorporated herein by reference. The manual inputs or user actuatable inputs or actuators may control or adjust or activate/deactivate one or more accessories or elements or features. For touch sensitive inputs or applications or switches, the mirror assembly or accessory module or input may, when activated, provide a positive feedback (such as activation of an illumination source or the like, or such as via an audible signal, such as a chime or the like, or a tactile or haptic signal, or a rumble device or signal or the like) to the user so that the user is made aware that the input was successfully activated.

Optionally, a variety of display types or screens can be utilized in conjunction with an interior rearview mirror assembly or windshield electronics module/accessory module of the present invention. For example, any of the liquid crystal type display or video screens (such as the types disclosed in PCT Application No. PCT/US03/40611, filed Dec. 19, 2003 by Donnelly Corp. et al. for ACCESSORY SYSTEM FOR VEHICLE, and/or U.S. provisional applications, Ser. No. 60/630,061, filed Nov. 22, 2004 by Lynam et al. for MIRROR ASSEMBLY WITH VIDEO DISPLAY; and Ser. No. 60/667,048, filed Mar. 31, 2005 by Lynam et al. for MIRROR ASSEMBLY WITH VIDEO DISPLAY, which are hereby incorporated herein by reference) can be utilized. Also, a microdisplay (such as is available from MicroVision Inc. of Bothell, Wash.), in which a single scanner is used to direct multiple light beams simultaneously into separate zones of an image so as to deliver a bright, high resolution, image over a wide field of view, can be used. Such a microdisplay may utilize conventional surface emitting or other types of light emitting diodes (LEDs) as light sources to provide an economical display with sharp resolution and high image brightness. For example, multiple red, green and blue LEDs or red, blue and green laser diodes can be used to write several million red, green, and blue spots that integrate to form a single high-fidelity image in a mega pixel display image. Such scanning display technologies can utilize a biaxial microelectromechanical scanner (MEMS) and other display/mechanical and electronics devices, such as are disclosed in U.S. Pat. Nos. 6,714,331; 6,795,221; and 6,762,867, which are hereby incorporated herein by reference, and can provide increased spatial resolution. Such displays can deliver an image with a full 30-degree horizontal field of view or more. Such a microdisplay/MEMS device can, for example, be placed in the mirror housing behind the mirror reflective element in an interior (or exterior) mirror assembly such that the image is projected onto the rear of the mirror reflective element, such as is disclosed in U.S. patent applications, Ser. No. 10/225,851, filed Aug. 22, 2002 by Burgner for VEHICLE INFORMATION DISPLAY, now U.S. Pat. No. 6,847,487; ; Ser. No. 11/226,628, filed Sep. 14, 2005 by Karner et al. for MOUNTING ASSEMBLY FOR VEHICLE INTERIOR MIRROR; and/or Ser. No. 11/105,757, filed Apr. 14, 2005 by Schofield et al. for IMAGING SYSTEM FOR VEHICLE; and/or U.S. provisional application, Ser. No. 60/607,963, filed Sep. 8, 2004 by Schofield for IMAGING SYSTEM FOR VEHICLE, which are hereby incorporated herein by reference.

If the mirror reflector of the mirror element is of the transflective (substantially reflective and at least partially transmitting to light) type, the driver or other occupant in the interior cabin of the vehicle can view the image (being backprojected onto the rear of the mirror reflective element) by viewing the mirror reflective element. This is because the front surface of the reflective element will typically reflect about 4 percent of the light incident on the reflective element toward the driver of the vehicle. Thus, if the display illumination (projected through the reflective element from behind the reflective element and within the mirror casing) does not dominate or distinguish over the reflectance off of the front surface of the mirror reflective element, the display illumination and information may appear washed out due to the reflected image that is reflecting off of the front surface of the reflective element. Such washout may be particularly noticeable during high ambient lighting or daytime lighting conditions. Because such back-projected microdisplays can have a very high image brightness (due to use of very high brightness LEDs, preferably organic LEDs (OLEDs), or lasers as illuminators), image wash-out during driving under high ambient lighting conditions (such as on a sunny day) is reduced using such scanning image microdisplay technology compared to use, for example, of TFT LCD displays.

Optionally, such microdisplays or TFT LCD displays or the like may incorporate a cooling device to reduce the temperature surrounding the device to provide enhanced performance of the device in high ambient temperature conditions. Typically, such LCD screens and the like may be selected to perform within a specified temperature range. If a greater operating temperature is desired, a display device that is capable of operating at the higher temperatures may be selected, typically at a cost premium for the greater operating range. In some situations, it may be cost effective to utilize a lower range or lower temperature display device and utilize a heating and/or cooling device at or near or attached to the display device (such as to a rear surface of the LCD display) to heat and/or cool the display device when the temperature at the display device is below or above the range of the display device. For example, a thermoelectric module, such as a Peltier device, may be utilized. Such thermoelectric modules are typically small solid-state devices that function as heat pumps. The module may comprise a sandwich formed by two ceramic plates with an array of small Bismuth Telluride cubes ("couples") or the like in between. When a current is applied to the module, heat may be moved from one side of the device to the other—where it may be dissipated or removed with a heat sink or the like. The "cold" side may be used to cool the display device. If the current is reversed, such thermoelectric modules may perform a heating function. Such a Peltier device thus may be positioned in direct contact with the rear of the LCD screen so that the Peltier device can thermally cool or heat the LCD screen by conduction of heat to the screen or extraction of heat from the screen. The Peltier device thus may provide rapid heating or cooling of the display device so that the temperature at the display device is within the desired or appropriate range.

Also, such MEMS technology can be used in a heads-up-display (HUD) system, such as the MicroHUD™ head-up display system available from MicroVision Inc. of Bothell, Wash. (and such as described in U.S. patent application, Ser. No. 11/029,695, filed Jan. 5, 2005 by Lindahl et al. for MIRROR ASSEMBLY, now U.S. Pat. No. 7,253,723, which is hereby incorporated herein by reference). This provides a compact heads-up display capable of meeting specific size and performance specifications. For example, MicroVision's MicroHUD™ combines a MEMS-based micro display with an optical package of lenses and mirrors to achieve a compact high-performance HUD module that reflects a virtual image off the windscreen that appears to the driver to be close to the front of the car. This laser-scanning display can outperform many miniature flat panel LCD display screens because it can be clearly viewed in the brightest conditions and also dimmed to the very low brightness levels required for safe night-time driving.

The high-resolution MicroHUD™ display may be completely reconfigurable, enabling virtually any content to be displayed, including video or animated icons and graphics. Advantageously, such a MicroHUD™ display unit may be included at or within an interior rearview mirror assembly or a windshield electronics module/accessory module so as to project its image therefrom onto the inner surface of the windshield. This unique packaging of a HUD or projection image displayer into an interior rearview mirror assembly or a windshield electronics module/accessory module has advantages over conventional placement of such HUD projectors into the dashboard of the vehicle. These advantages include that the HUD image projector need not find space in an already crowded dashboard (where, for example, a center information cluster may want space or where HVAC ducts/components may run). Also, incorporation of the HUD projector in the likes of the mounting portion of the interior mirror assembly or into a windshield electronics module/accessory module can allow a HUD display to be provided more readily as an optional accessory for the vehicle or as a dealership option or aftermarket device. A variety of images (such as, for example, iconistic or graphical or video or textural or alphanumerical or numerical or the like) can be displayed, such as information from a side object/blind spot monitoring system and/or alert system and/or display device or system, such as the types described in U.S. Pat. No. 5,929,786, and/or U.S. patent applications, Ser. No. 10/427,051, filed Apr. 30, 2003 by Pawlicki et al. for OBJECT DETECTION SYSTEM FOR VEHICLE, now U.S. Pat. No. 7,038,577; and/or Ser. No. 10/209,173, filed Jul. 31, 2002 by Schofield for AUTOMOTIVE LANE CHANGE AID, now U.S. Pat. No. 6,882,287, and/or U.S. provisional applications, Ser. No. 60/638,687, filed Dec. 23, 2004 by Higgins-Luthman for OBJECT DETECTION SYSTEM FOR VEHICLE; Ser. No. 60/696,953, filed Jul. 6, 2005 by Lynam for VEHICLE EXTERIOR MIRROR ASSEMBLY WITH BLIND SPOT INDICATOR; and/or Ser. No. 60/717,093, filed Sep. 14, 2005 by Lynam for DISPLAY DEVICE FOR EXTERIOR REARVIEW MIRROR, which are all hereby incorporated herein by reference.

Also, a full video image captured by the likes of a reversing camera or a forward facing night vision camera or a sidelane-monitoring camera can be displayed on/via the vehicle windshield (or elsewhere) by the likes of a MicroHUD™ device and, conceptually, thus replacing the exterior mirrors with cameras. For example, a driver sidelane video image and a passenger sidelane video image, both preferably with graphic overlays thereon, can be displayed at respective sides of the vehicle windshield via a MEMS-based display system (such as via a MicroHUD™ HUD display device) and with the image visible to the driver by viewing the vehicle windshield (such as via an optical image combiner created on the inner glass surface of the windshield and/or onto the polymeric laminating interlayer (typically a sheet of polyvinyl butyral or of silicone or the like) utilized in the laminate windshield).

Optionally, a laser emitter or laser diode or the like may be positioned within the mirror casing and behind the reflective element, and may be used to emit radiation onto a reflector (such as a microelectromechanical scanner (MEMS)) within the mirror casing that reflects the radiation toward and through the mirror reflective element for viewing by a driver of the vehicle (such as by utilizing aspects described in U.S. patent applications, Ser. No. 10/225,851, filed Aug. 22, 2002 by Burgner for VEHICLE INFORMATION DISPLAY, now U.S. Pat. No. 6,847,487; Ser. No. 11/226,628, filed Sep. 14, 2005 by Karner et al. for MOUNTING ASSEMBLY FOR VEHICLE INTERIOR MIRROR; and/or Ser. No. 11/105,757, filed Apr. 14, 2005 by Schofield et al. for IMAGING SYSTEM FOR VEHICLE; and/or U.S. provisional applications, Ser. No. 60/607,963, filed Sep. 8, 2004 by Schofield for IMAGING SYSTEM FOR VEHICLE; Ser. No. 60/642,227, filed Jan. 7, 2005; and Ser. No. 60/644,903, filed Jan. 19, 2005 by Byers et al. for MIRROR ASSEMBLY WITH HEATER ELEMENT. which are all hereby incorporated herein by reference).

Such a laser scanning display device may provide enhanced display characteristics for enhanced viewing of the display at the reflective element by the driver of the vehicle. Typically, in order to use a laser to back light a display area (such as an area of about two cm square or thereabouts), the laser beam may be projected through an optic that broadens the beam to the desired size, whereby the intensity of the beam is reduced. An advantage of such scanning display technologies is the intensity of the display delivered, and thus its ability to be seen even under high ambient driving conditions (such as a sunny day). For example, should a standard backlit TFT LCD display be placed behind a transflective mirror element in the likes of an interior rearview mirror assembly, the front or first surface reflection off the front glass surface (typically around 4 percent of the light incident thereon) often far exceeds the intensity of the light transmitted through the transflective mirror reflective element used. Such transflective mirrors also reflect coincident with the reflection off the front surface, and thus further exasperate the washout of the display image being transmitted/emitted through the reflective element. Even if the reflective coating is locally fully removed to create a light transmitting window, reflectivity off the front glass surface often causes display washout and inability to appropriately read what is being viewed at the display. This is particularly problematic for video display (such as for the likes of a rear backup event or side lane maneuver event or the like).

Thus, one advantage of use of such a scanning display technology (such as described in further detail below) is that the full intensity of the laser is used, but by using the movable mirror/reflector of the microelectromechanical scanner (MEMS), the narrow point-like, super high intensity beam rapidly moves across the display image dimension at a rate that is faster than the eye/brain can register, such that the eye/brain perceives a continuous (or substantially continuous) super bright image. Thus, using the concepts of the present invention as described below, a full video image can effectively be projected through or on a surface of the rearview mirror reflective element in a manner not unlike what can be seen during outdoor laser displays or the like (such as when images and video is laser written on the sides of buildings or clouds or the like). Also, multiple lasers of the same color can be focused so that their beams coincide at roughly the same point on the MEMS reflector so that the intensity of any one image element as written is correspondingly enhanced.

Figure 3:
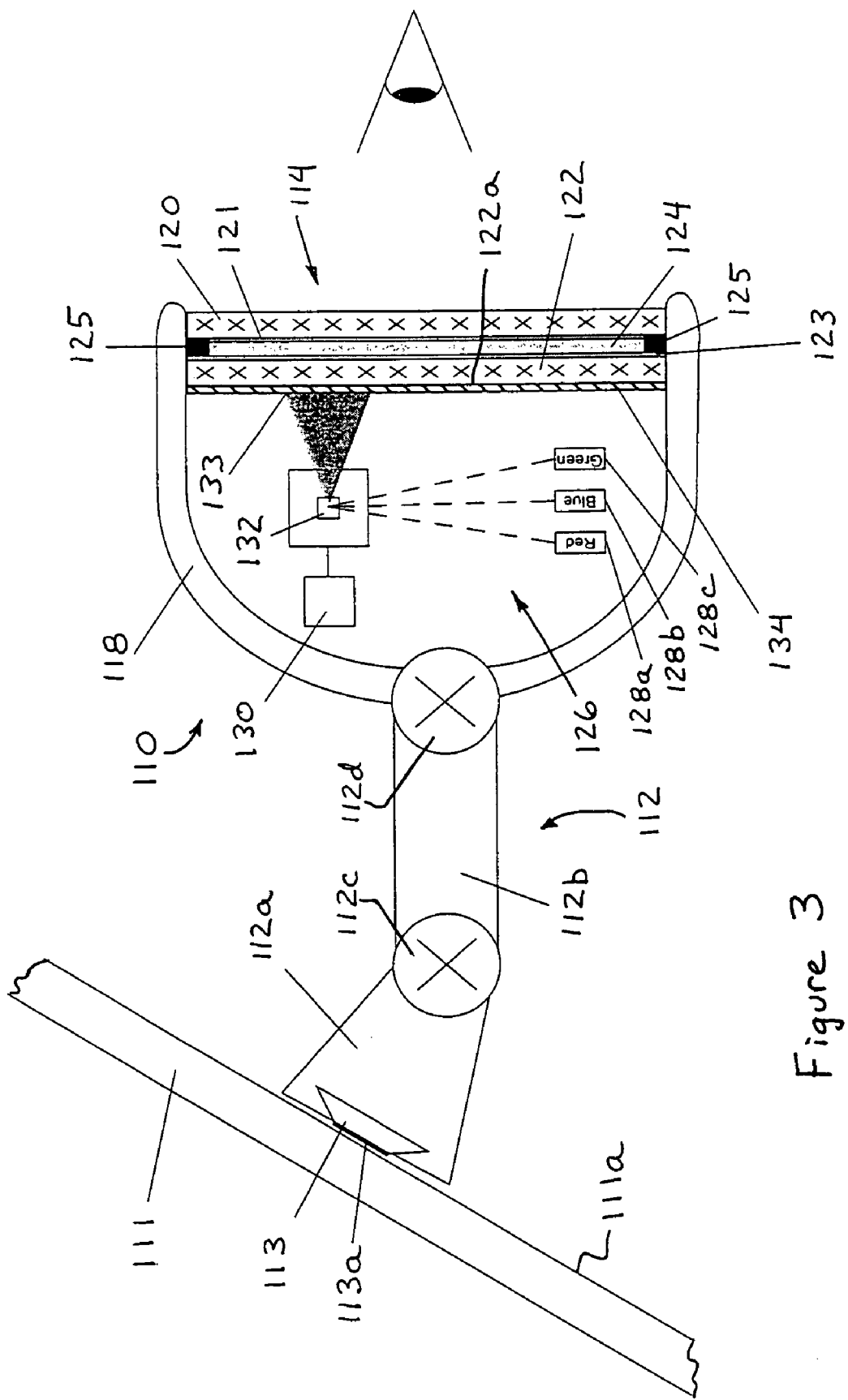
FIG. 3 is a sectional view of an interior rearview mirror assembly incorporating a laser display device in accordance with the present invention.

For example, and with reference to FIG. 3, an interior rearview mirror assembly 110 may be pivotally or adjustably mounted to an interior portion of a vehicle, such as via a double ball mounting or bracket assembly 112. Mirror assembly 110 includes an electro-optic or electrochromic reflective element 114 supported at or in a housing or casing 118. For example, the bracket assembly 112 may include a mirror mount 112a that is mountable to a mounting button 113 adhered or bonded (such as via an adhesive layer 113a or the like) to an interior surface 111a of a vehicle windshield 111. The bracket assembly 112 may also include a mounting arm 112b that is pivotally attached to the mirror mount 112a at a first pivot joint 112c and that is pivotally attached to the mirror casing or mirror head at a second pivot joint 112d. Other means for adjustably mounting the mirror head to an interior portion of the vehicle may be implemented without affecting the scope of the present invention.

Mirror assembly 110 includes an electro-optic or electrochromic reflective element 114 supported at or in mirror housing or casing 118. The mirror assembly 110 includes a scanning display device 126 that is operable to display information (such as text, alphanumeric characters, icons, images, video images, or other indicia or information or the like) at the reflective element 114 for viewing by a driver of the vehicle. Advantageously, display device 126 is housed behind (to the rear of) the mirror reflective element and thus is within mirror casing 118. Thus, the automaker may acquire and install mirror assembly 110 (with the scanning display capability included) across a variety of vehicle models and lines.

Reflective element 114 includes a front substrate 120 and a rear substrate 122 and an electro-optic medium 124 disposed therebetween with a seal 125 encompassing the electro-optic medium, as is known in the electro-optic mirror arts. The front substrate 120 includes a transparent conductive coating or layer 121 at its rear surface (commonly referred to as the second surface of the reflective element), while the rear substrate 122 includes a conductive coating 123 at its front or forward surface (commonly referred to as the third surface of the reflective element).

The reflective element may comprise a transflective reflective element that allows light from the display device 126 to pass therethrough for viewing by the driver of the vehicle, such as by utilizing principles described in U.S. Pat. Nos. 6,690,268; 5,668,663 and/or 5,724,187, and/or in U.S. patent applications, Ser. No. 10/054,633, filed Jan. 22, 2002 by Lynam et al. for VEHICULAR LIGHTING SYSTEM, now U.S. Pat. No. 7,195,381; and/or Ser. No. 11/021,065, filed Dec. 23, 2004 by McCabe et al. for ELECTRO-OPTIC MIRROR CELL, now U.S. Pat. No. 7,255,451; and/or PCT Application No. PCT/US03/29776, filed Sep. 9, 2003 by Donnelly Corp. et al. for MIRROR REFLECTIVE ELEMENT ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or U.S. provisional applications, Ser. No. 60/630,061, filed Nov. 22, 2004 by Lynam et al. for MIRROR ASSEMBLY WITH VIDEO DISPLAY; Ser. No. 60/667,048, filed Mar. 31, 2005 by Lynam et al. for MIRROR ASSEMBLY WITH VIDEO DISPLAY; Ser. No. 60/629,926, filed Nov. 22, 2004 by McCabe et al. for METHOD OF MANUFACTURING ELECTRO-OPTIC MIRROR CELL; Ser. No. 60/531,838, filed Dec. 23, 2003; Ser. No. 60/553,842, filed Mar. 17, 2004; Ser. No. 60/563,342, filed Apr. 19, 2004; Ser. No. 60/644,903, filed Jan. 19, 2005; Ser. No. 60/667,049, filed Mar. 31, 2005 by Byers et al. for MIRROR ASSEMBLY WITH HEATER ELEMENT; Ser. No. 60/653,787, filed Feb. 17, 2005 by Karner et al. for MOUNTING ASSEMBLY FOR MIRROR AND METHOD OF MAKING SAME; Ser. No. 60/642,227, filed Jan. 7, 2005; Ser. No. 60/638,250, filed Dec. 21, 2004; Ser. No. 60/624,091, filed Nov. 1, 2004; and Ser. No. 60/609,642, filed Sep. 14, 2004, and/or PCT Application No. PCT/US03/40611, filed Dec. 19, 2003 by Donnelly Corp. et al. for ACCESSORY SYSTEM FOR VEHICLE, which are all hereby incorporated herein by reference. Optionally, use of an elemental semiconductor mirror, such as a silicon metal mirror, such as disclosed in U.S. Pat. Nos. 6,286,965; 6,196,688; 5,535,056; 5,751,489; and 6,065,840, and/or in U.S. patent application, Ser. No. 10/993,302, filed Nov. 19, 2004 by Lynam for MIRROR REFLECTIVE ELEMENT FOR A VEHICLE, now U.S. Pat. No. 7,338,177which are all hereby incorporated herein by reference, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side mirrors are bent or curved.

Optionally, the curved reflective element or glass substrate may be formed by first taking flat glass sheets/shapes that are hydrophilic coated and then bending the glass sheets/shapes to from bent (convex or aspheric) sheets/shapes. The bent sheets/shapes are non-crazed/optically clear after bending and still maintain the hydrophilic property after bending. Optionally, the bent sheets/shapes can then also be coated with a transparent conductive material, such as an ITO material or the like, on their "second" surface, such that such a hydrophilic first surface coated and transparent conductive material coated second surface substrate can be used as a front or first substrate in an electro-optic reflective element or mirror cell, such as an electrochromic reflective element or mirror cell.

Display device 126 comprises a scanning beam display system that includes a plurality of laser light sources or diodes 128a, 128b, 128c, a controller 130 and a microelectromechanical scanner (MEMS) 132. The display device 126 is contained within the interior casing 118 of mirror assembly 110. The controller 130 receives and/or generates image signals that control the intensity, mix and on-time of the light output by the three laser diodes 128a, 128b, 128c. The controller 130 also establishes the coordinates for the movable elements of the MEMS assembly 132 so that the individual picture elements (pixels) of the displayed image (as displayed at the display area or region 133 at the reflective element 114) are created for view by the driver or other vehicular occupant. For monochrome (one-color) systems, only one laser diode source may be used. Optionally, for full-color displays, three light sources (e.g., red, green and blue) are modulated and merged to produce an image element of the appropriate color. Under the control of controller 130, a horizontal and vertical scanner or a single micro-electromechanical scanner (MEMS) 132 directs the light beams received from laser diodes 128a, 128b, 128c, and projects them onto the rear of (and/or into the body of) mirror reflective element 114 to create the image viewed. Optics (not shown) may be included as desired to achieve the desired spatial and resolution dimensions displayed.

For example, mirrors and/or lens elements or other refractive or diffractive and/or reflective optical elements can be used to project the rapidly scanned beam or beams of light onto the rear of the mirror element (and/or into the body thereof) to create the image seen. Such a scanned-beam automotive mirror display can deliver very high resolution, very high intensity images, with the resolution being limited principally by diffraction and optical aberrations in the- light sources used within the mirror casing. Optionally, the rear surface 122a of the rear substrate 122 of the reflective element 114 may include a diffuser coating or layer/combiner 134 or other diffuser means or the like, and the diffuser coating or layer or area may be over substantially the entire rear surface 122a or may be over only that portion of the rear or fourth surface rastered by light reflected off the MEMS 132 that creates the display image. Also, and optionally, diffuser coatings and/or layers/combiners may be included within the body of the mirror reflective element, such as on the third surface of the electro-optic reflective element.

Although illustrated as a transflective mirror element, the reflective coating may be locally removed from a non-transflective mirror element to create a window for viewing the display thereat or therethrough. The window region may include a diffuse coating and/or layer/combiner or the like, such as on the rear surface of the reflective element (such as if the reflective element is an electro-optic or electrochromic reflective element or a non-electro-optic or prismatic reflective element) or on the third surface (such as if the reflective element is a electro-optic or electrochromic reflective element), if desired.

The laser diodes may be rastered or scanned at a desired rate over the MEMS reflector so that a generally continuous image is created by reflection off the MEMS and onto/into and as viewed through the reflective element. In the illustrated embodiment, the laser diodes are positioned to project or emit or radiate their laser beams so that they are incident on the electromechanically moved portion of the MEMS and whereby the laser beams are reflected toward the reflective element by the MEMS reflector.

The MEMS 132 may be positioned within the casing and angled or oriented to reflect illumination or radiation from the laser diodes 128a, 128b, 128c toward the rear surface of the reflective element 114. The reflective surface of the MEMS 132 may be created on a chip, and may be adjusted to provide the desired projection or reflection angle through the reflective element 114 for viewing by a driver of the vehicle. The MEMS reflector may be electrically adjusted and/or electromechanically adjusted to provide the appropriate or desired information or icon or image for the laser beams to project onto and through the reflective element. The laser diodes 128a, 128b, 128c may comprise any laser diodes, such as, for example, laser diodes of the types commercially available from Cree Research Inc. of Durham, N.C., which offers different color laser diodes, such as visible red laser diodes and/or blue laser diodes, such as gallium nitride based blue lasers, and other colors as may be desired, such as, for example, green.

Because of the high intensity illumination provided by such laser diodes, the intensity at the display region of the reflective element will be sufficient to dominate the reflection of the rearward scene off of the front surface of the front substrate of the reflective element, and thus will not appear washed out, even during high ambient lighting conditions, such as on a sunny day or the like. Optionally, the intensity of the laser diodes may be adjusted, such as via manual adjustment and/or via automatic adjustment, such as in response to the ambient light levels in the cabin of the vehicle or in the vicinity of the display. The display information may be associated with any accessory or component or feature of the interior rearview mirror assembly or of the vehicle, such as point-to-point navigational instructions, status information for various functions, such as passenger side airbag status, tire pressure status and/or the like, or compass heading or temperature information or other information or the like.

Also, a video display and/or other information display may be located at the interior mirror assembly (or at a windshield electronics module/accessory module) that utilizes a Micro-Electro-Mechanical-Systems (MEMS) structure combined with thin film optics, such as is available Iridigm of San Francisco, Calif. under the tradename iMoD™ technology. This display technology (such as is described in U.S. Pat. Nos. 6,794,119; 6,741,377; 6,710,908; 6,680,792; 6,674,562; 6,650,455; 6,589,625; 6,574,033; 5,986,796; and 5,835,255, which are hereby incorporated herein by reference) is designed to deliver lower power consumption and excellent display image quality, and can withstand extreme temperatures and can be viewed in substantially any environment, including bright sunlight.

Although shown and described as being incorporated into an electro-optic or electrochromic interior rearview mirror assembly, it is envisioned that the scanning beam display system may be incorporated into a prismatic interior rearview mirror assembly or a transflective prismatic rearview mirror assembly (such as by utilizing principles described in PCT Application No. PCT/US03/29776, filed Sep. 19, 2003 by Donnelly Corp. et al. for MIRROR REFLECTIVE ELEMENT ASSEMBLY; U.S. patent applications, Ser. No. 11/021,065, filed Dec. 23, 2004 by McCabe et al. for ELECTRO-OPTIC MIRROR CELL, now U.S. Pat. No. 7,255,451; and/or Ser. No. 10/993,302, filed Nov. 19, 2004 by Lynam for MIRROR REFLECTIVE ELEMENT FOR A VEHICLE, now U.S. Pat. No. 7,338,177which are all hereby incorporated herein by reference). Optionally, the laser scanning beam display system may be incorporated into an exterior rearview mirror assembly without affecting the scope of the present invention. For exterior rearview mirror applications, the display system may function to display blind spot detection icons or information, or turn signals or security lights or the like, at the reflective element of the exterior rearview mirror assembly of the vehicle. For example, a non-electro-optic/fixed reflectivity reflector may use an elemental semiconductor mirror, such as a silicon metal mirror, such as disclosed. in U.S. Pat. Nos. 6,286,965; 6,196,688; 5,535,056; 5,751,489; and 6,065,840, and/or in U.S. patent application Ser. No. 10/993,302, filed Nov. 19, 2004 by Lynam for MIRROR REFLECTIVE ELEMENT FOR A VEHICLE, now U.S. Pat. No. 7,338,177, which are all hereby incorporated herein by reference, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side mirrors are bent or curved.

The display thus may comprise a laser emitter or laser diode or the like, which may be positioned within the mirror casing and behind the reflective element, and may be used to emit radiation onto a reflector (such as a microelectromechanical scanner (MEMS)) within the mirror casing that reflects the radiation toward and through the mirror reflective element for viewing by a driver of the vehicle (such as by utilizing aspects described in U.S. patent applications, Ser. No. 10/225,851, filed Aug. 22, 2002 by Burgner for VEHICLE INFORMATION DISPLAY, now U.S. Pat. No. 6,847,487); Ser. No. 11/226,628, filed Sep. 14, 2005 by Karner et al. for MOUNTING ASSEMBLY FOR VEHICLE INTERIOR MIRROR; and/or Ser. No. 11/105,757, filed Apr. 14, 2005 by Schofield et al. for IMAGING SYSTEM FOR VEHICLE; and/or U.S. provisional applications, Ser. No. 60/644,903, filed Jan. 19, 2005; Ser. No. 60/642,227, filed Jan. 7, 2005 by Karner et al. for MOUNTING ASSEMBLY FOR MIRROR AND METHOD OF MAKING SAME; and/or Ser. No. 60/607,963, filed Sep. 8, 2004 by Schofield for IMAGING SYSTEM FOR VEHICLE, which are hereby incorporated herein by reference). The light emitting device, such as a laser diode or light emitting diode (LED) or the like, of the display may be controlled by a controller, which may modulate the intensity or on/off characteristic of the emitted light while the light emitting device or laser is rastered (or moved rapidly back and forth in generally horizontal or vertical scanning lines over a display area), in order to create the desired display via the points where the light emitting device is intensified or activated. Because the laser diode may be rastered at a high rate over substantially the entire display area but only activated/intensified at appropriate locations to form the desired display, the narrow point like, super high intensity beam (that is activated/intensified/modulated as the laser diode is rapidly moved across the display image dimension at a rate that is faster than the eye/brain can register) is perceived by the human eye/brain as a continuous (or substantially continuous) super bright image, even though only one light "dot" or beam may actually be present at a time at the display. A person viewing the display thus would see the display as the desired form or character and substantially constantly and brightly illuminated by the rastered and modulated laser diode.

Optionally, the light emitting device may be substantially constantly activated and directed/rastered toward a display window, such as a liquid crystal display (LCD) or the like, with a window established in the desired form, so that light emitted by the light emitting device (such as a laser diode, a light emitting diode (LED) or an organic light emitting diode (OLED) or the like) projects or shines through the display window/element, such that the display character or icon or information or video or the like is viewable at the reflective element by the driver of the vehicle. The display window may comprise a substantially transparent or translucent shape or character or icon or the like, with a darkened or substantially opaque area surrounding the window, such that light emitted by the light emitting device passes through or transmits through the window, but is substantially blocked or attenuated by the surrounding opaque area of the display. The LCD display may be operable to adjust the window and opaque regions to adjust or modulate or change or control the information being displayed by the light passing through the display. For applications where the light emitting device may be rastered at a high rate over substantially the entire display area (such as over the LCD), and with the illumination beam (such as the narrow point like, super high intensity beam of a laser emitting device) rapidly moving across the display image dimension at a rate that is faster than the eye/brain can register, the eye/brain perceives a continuous (or substantially continuous) bright image, even though only one light "dot" or beam may be present at a time through the display window. The light emitting device thus may be constantly or substantially constantly activated/energized, with the display being formed/created by the window through which the light passes as the light beam is rastered or scanned over the display device. A person viewing the display thus would see the display as the character of the display window as substantially constantly and brightly illuminated by the rastered laser diode or other light emitting device, such as an LED or OLED or the like.

Note that is desirable, and in many cases preferable, that the laser light source be only enabled when the MEMS unit is functioning and causing a rastering or the like of the reflected laser beam. This is to limit or substantially preclude or prevent the possibility of the laser beam being stationary for any prolonged period with a concomitant possibility of eye damage to viewer in the vehicle. Thus, the circuitry/software controlling activation/illumination of the laser light source can be tied to the circuitry/software controlling activation/movement of the movable reflector of the MEMS unit, such that should the system fail and the MEMS unit not move or cease rastering, then the laser source is extinguished/turned off so that danger to a viewer from laser eye burn or the like is obviated.

Optionally, the mirror assembly or accessory module or windshield electronics module of the present invention may include one or more user inputs for controlling or adjusting the display or alert system. For example, a projected information display and/or virtual human machine interface (HMI) may be created at a surface of an interior mirror assembly or a windshield electronics module/accessory module utilizing a virtual data entry device system, such as is disclosed in U.S. patent Pub. No. 20020075240, published Jun. 20, 2002, which is hereby incorporated herein by reference. Thus, an optically generated image of a key-entry tablet or an input menu or user-actuation button/input or an icon or an informational message or the like can be projected, for example, onto a surface of the interior rearview mirror or elsewhere within the cabin of the vehicle. The projected image may include at least one input zone/user interface zone that is actuatable by an action performed thereon or thereat by a user. The system includes a sensor operative to sense the action performed on or at the at least one input zone, and to generate signals in response to the detected action. A control or processor in communication with the sensor is operable to process the signals for performing an operation associated with the at least one input zone.

For example, a template of the desired interface (such as a keyboard or input options or the like) may be projected onto an interface surface (such as the reflective element of the interior mirror assembly). The template is produced by illuminating an optical element (such as a holographic optical element) with a laser diode (such as a red laser diode or the like). Because the template functions only as a reference for the user and is not involved in the detection process, the template may optionally be printed at a desired surface, such as at a portion of the reflective element or casing of the mirror assembly (or at a casing or element of a windshield electronics module or accessory module or the like).

An infrared plane of light may be generated at and slightly spaced from and parallel to the interface surface. The light may be substantially invisible to the user and is positioned just a few millimeters away from the interface surface (such as along the first surface of the reflective element and a few millimeters toward the driver or toward the rear of the vehicle from the first surface of the reflective element). Accordingly, when a user touches a portion of the projected interface at the interface surface (for example, the first surface of the reflective element of the interior mirror assembly), light is reflected from the plane in the vicinity of the respective input or key that was "touched" and directed toward the sensor module.

The reflected light from the user interaction with the interface surface is received by or imaged onto an imaging array sensor, such as a CMOS image sensor or the like, in a sensor module. The reflected light may pass through an infrared filter before being imaged onto the CMOS sensor. The sensor control or processor or chip then may conduct a real-time determination of the location of the reflected light, and may be operable to track multiple reflection events substantially simultaneously, and can thus support both multiple inputs/keystrokes and overlapping cursor control inputs and the like. The micro-controller (which may be positioned in the sensor module) receives the positional information corresponding to the light flashes from the sensor control or processor, and interprets the events and communicates them through an appropriate interface to the appropriate external device or devices.

The projected interface and sensor system thus may provide a keypad or input interface at the reflective element for actuation/use by the driver or occupant of the vehicle. The keypad or input interface may be projected onto or at the reflective element only when it is desired to be used, such that the reflective element is substantially unaffected by the incorporation of the interface and sensor system at the interior rearview mirror assembly. The sensor may detect the input action performed/selected by the user and the control may then control or activate/deactivate or modulate or adjust the appropriate accessory or system or device of the vehicle.

The information or input interface that is projected may provide various inputs/actions, such as, for example, inputs for a video display of the vehicle (such as disclosed in U.S. Pat. Nos. 5,760,962 and/or 5,877,897; and/or PCT Application No. PCT/US03/40611, filed Dec. 19, 2003 by Donnelly Corp. et al. for ACCESSORY SYSTEM FOR VEHICLE, and/or U.S. provisional applications, Ser. No. 60/630,061, filed Nov. 22, 2004 by Lynam et al. for MIRROR ASSEMBLY WITH VIDEO DISPLAY; Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; and/or Ser. No. 60/618,686, filed Oct. 14, 2004 by Laubinger for VEHICLE IMAGING SYSTEM, which are hereby incorporated herein by reference), a communications system of the vehicle (such as disclosed in U.S. Pat. Nos. 6,717,524; 6,650,233; 6,243,003; 6,278,377; and/or 6,420,975, and/or PCT Application No. PCT/US03/30877, filed Oct. 1, 2003, and/or U.S. patent application Ser. No. 10/529,715, filed Mar. 30, 2005 by Larson et al. for MICROPHONE SYSTEM FOR VEHICLE, which are hereby incorporated herein by reference), a navigational system of the vehicle (such as the types described in U.S. Pat. No. 6,477,464, and U.S. patent applications, Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/287,178, filed Nov. 4, 2002 by McCarthy et al. for NAVIGATION SYSTEM FOR A VEHICLE, now U.S. Pat. No. 6,678,614; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003 by Donnelly Corporation et al. for ACCESSORY SYSTEM FOR VEHICLE, which are hereby incorporated herein by reference), light sources (such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; and/or 5,669,698, and/or U.S. patent application, Ser. No. 10/054,633, filed Jan. 22, 2002 by Lynam et al. for VEHICULAR LIGHTING SYSTEM, now U.S. Pat. No. 7,195,381, which are hereby incorporated herein by reference) and/or the like. Optionally, different interfaces may be provided for different accessories or devices or functions, whereby the appropriate interface for a particular accessory or device or function may be selected by the user, and the desired particular function of that accessory or device may then be selected and activated or deactivated or controlled by "touching" the appropriate location at the surface (such as the first surface of the reflective element) upon which the interface keypad or input is projected.

Other types of displays or display elements or devices and controls or inputs for such displays or display elements or devices may be implemented with the alert system of the present invention, without affecting the scope of the present invention.

Optionally, the mirror assembly may include one or more accessories incorporated onto the printed circuit board or positioned elsewhere at or within the mirror casing or at or within an accessory module or windshield electronics module associated with the interior rearview mirror assembly. For example, the accessory or accessories may include one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot or object detection system, such as imaging or detection systems of the types disclosed in U.S. Pat. Nos. 5,929,786 and/or 5,786,772, and/or U.S. patent applications, Ser. No. 10/427,051, filed Apr. 30, 2003 by Pawlicki et al. for OBJECT DETECTION SYSTEM FOR VEHICLE, now U.S. Pat. No. 7,038,577; and/or Ser. No. 10/534,632, filed May 11, 2005 by Bingle et al. for IMAGING SYSTEM FOR VEHICLE, and/or U.S. provisional applications, Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; Ser. No. 60/618,686, filed Oct. 14, 2004 by Laubinger for VEHICLE IMAGING SYSTEM; Ser. No. 60/638,687, filed Dec. 23, 2004 by Higgins-Luthman for OBJECT DETECTION SYSTEM FOR VEHICLE, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093; and/or U.S. provisional applications, Ser. No. 60/607,963, filed Sep. 8, 2004 by Schofield for IMAGING SYSTEM FOR VEHICLE; and Ser. No. 60/562,480, filed Apr. 15, 2004 by Schofield for IMAGING SYSTEM FOR VEHICLE; and/or U.S. patent application Ser. No. 11/105,757, filed Apr. 14, 2005 by Schofield et al. for IMAGING SYSTEM FOR VEHICLE, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897; and/or PCT Application No. PCT/US03/40611, filed Dec. 19, 2003 by Donnelly Corp. et al. for ACCESSORY SYSTEM FOR VEHICLE, and/or U.S. provisional applications, Ser. No. 60/630,061, filed Nov. 22, 2004 by Lynam et al. for MIRROR ASSEMBLY WITH VIDEO DISPLAY; and Ser. No. 60/667, 048, filed Mar. 31, 2005 by Lynam et al. for MIRROR ASSEMBLY WITH VIDEO DISPLAY, a remote keyless entry receiver or system or circuitry and/or a universal garage door opening system or circuitry (such as the types disclosed in U.S. Pat. Nos. 6,396,408; 6,362,771; 5,798,688 and 5,479, 155, and/or U.S. patent application, Ser. No. 10/770,736, filed Feb. 3, 2004 by Baumgardner et al. for GARAGE DOOR OPENING SYSTEM FOR VEHICLE, now U.S. Pat. No. 7,023,322, lights, such as map reading lights or one or more other lights or illumination sources, such as disclosed in U.S. Pat. Nos. 6,690,268; 5,938,321; 5,813,745; 5,820,245; 5,673, 994; 5,649,756; 5,178,448; 5,671,996; 4,646,210; 4,733,336; 4,807,096; 6,042,253; and/or 5,669,698, and/or U.S. patent application, Ser. No. 10/054,633, filed Jan. 22, 2002 by Lynam et al. for VEHICULAR LIGHTING SYSTEM, now U.S. Pat. No. 7,195,381, microphones, such as disclosed in U.S. Pat. Nos. 6,717,524; 6,650,233; 6,243,003; 6,278,377; and/or 6,420,975, and/or PCT Application No. PCT/US03/ 30877, filed Oct. 1, 2003, speakers, a compass or compass system, such as disclosed in U.S. Pat. Nos. 5,924,212; 4,862, 594; 4,937,945; 5,131,154; 5,255,442; and/or 5,632,092, and/or U.S. patent application, Ser. No. 10/456,599, filed Jun. 6, 2003 by Weller et al. for INTERIOR REARVIEW MIRROR SYSTEM WITH COMPASS, now U.S. Pat. No. 7,004, 593; and/or U.S. provisional application, Ser. No. 60/636, 931, filed Dec. 17, 2004 by Blank et al. for INTERIOR REARVIEW MIRROR SYSTEM WITH COMPASS, a navigation system, such as described in U.S. Pat. No. 6,477,464, and U.S. patent applications, Ser. No. 10/456,599, filed Jun. 6, 2003 by Weller et al. for INTERIOR REARVIEW MIRROR SYSTEM WITH COMPASS, now U.S. Pat. No. 7,004, 593; Ser. No. 10/287,178, filed Nov. 4, 2002 by McCarthy et al. for NAVIGATION SYSTEM FOR A VEHICLE, now U.S. Pat. No. 6,678,614; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/422,378, filed Apr. 24, 2003, now U.S. Pat. No. 6,946,978; and/or PCT Application No. PCT/ US03/40611, filed Dec. 19, 2003 by Donnelly Corporation et al. for ACCESSORY SYSTEM FOR VEHICLE, a tire pressure monitoring system, such as the types disclosed in U.S. Pat. Nos. 6,294,989; 6,445,287; and/or 6,472,979, and U.S. provisional application, Ser. No. 60/611,796, filed Sep. 21, 2004 by O'Brien for TIRE PRESSURE ALERT SYSTEM, a seat occupancy detector, a vehicle occupancy detector, such as the type described in U.S. provisional application, Ser. No. 60/630,364, filed Nov. 22, 2004 by Wåahlström for OCCUPANT DETECT-ION SYSTEM FOR VEHICLE, a trip computer, a telematics system, such as an ONSTAR® system or the like, and/or any other desired accessory or system or the like (with all of the above-referenced patents and patent applications and PCT applications and provisional applications being commonly assigned to Donnelly Corporation, and with the disclosures of all of the above referenced patents and patent applications and PCT applications and provisional applications being hereby incorporated herein by reference in their entireties).

Therefore, the present invention provides a tire pressure alert system that utilizes the telematic system of the vehicle to process tire pressure data and to alert the driver or occupant of the vehicle as to the tire pressure status. This communication may be done via a conversation between a remote telematics operator and the driver of the subject vehicle. For example, an operator or service center may convey tire pressure information, including the numerical pressure value at a low or reduced pressure tire, and optionally the numerical pressure value at the other tires as well, to the driver or occupant of the vehicle. The unique combination of a tire pressure monitoring system and a telematic system enhances the value to the driver of having both systems. Thus, even when the pressure in a tire may be only slightly reduced, the driver may be made aware of this condition and can choose to continue driving or to inflate the reduced pressure tire at the next service center to optimize fuel usage and/or to minimize tire wear. The intelligence necessary to analyze and decipher the sensed pressure values thus may be external to the vehicle, so that economies may be achieved by reducing the electronic content and capabilities of the circuitry and controls within the vehicle.

Changes and modifications to the specifically described embodiments may be carried out without departing from the principles of the present invention, which is intended to be limited only by the scope of the appended claims as interpreted according to the principles of patent law.

The embodiments of the invention in which an exclusive property or privilege is claimed are defined as follows:

1. A tire pressure alert system suitable for use in a vehicle, said tire pressure alert system comprising:
    a vehicular tire pressure monitoring system;
    a telematic system of the vehicle operable to wirelessly communicate between the vehicle and an external service provider external to the vehicle;
    wherein said tire pressure monitoring system is operable to detect or determine or estimate a tire pressure in a tire mounted on a wheel of the vehicle and to communicate an output signal indicative of the tire pressure to said external service provider, said external service provider receiving the output signal from said tire pressure monitoring system and processing the output signal and communicating an alert to the subject vehicle to alert the driver or occupant of the vehicle of a tire pressure condition;
    an interior rearview mirror assembly having a transflective reflective element; and
    a display element disposed behind said transflective reflective element and responsive to said alert and operable to emit visible alert information toward and through said transflective reflective element for viewing by the driver of the vehicle.

2. The tire pressure alert system of claim 1, wherein said tire pressure monitoring system includes a tire pressure sensor at each of at least two tires mounted on respective wheels of the vehicle.

3. The tire pressure alert system of claim 2, wherein said tire pressure monitoring system comprises a control operable to receive signals from said tire pressure sensors and to communicate the output signal to said external service provider, the output signal being indicative of the tire pressure at each of the at least two tires.

4. The tire pressure alert system of claim 3, wherein said control communicates the output signal to said external service provider when a communication link is established between the vehicle and the external service provider.

5. The tire pressure alert system of claim 4, wherein said communication link is established at least one of (a) when a user actuates the telematic system via actuating a user input or button in the vehicle, and (b) when the ignition of the vehicle is started.

6. The tire pressure alert system of claim 1, wherein said external service provider communicates the alert to the vehicle via at least one of (a) a voice communication from the external service provider to the vehicle, and (b) a wireless transmission of a control signal to the vehicle.

7. The tire pressure alert system of claim 1, wherein said external service provider communicates the alert to the vehicle via a wireless transmission of a control signal to the vehicle, said wireless control signal being operable to control an alert device in the vehicle.

8. The tire pressure alert system of claim 7, wherein said alert device comprises at least one of an audible alert device and a visual alert device.

9. The tire pressure alert system of claim 7, wherein said alert device comprises a visual alert at a display viewable by the driver of the vehicle.

10. The tire pressure alert system of claim 9, wherein said display comprises at least one laser diode operable to emit radiation, said at least one laser diode being rastered over a display area to provide a viewable display that is viewable and discernible by the driver of the vehicle.

11. A tire pressure alert system suitable for use in a vehicle, said tire pressure alert system comprising:
a vehicular tire pressure monitoring system;
a telematic system of the vehicle operable to wirelessly communicate between the vehicle and an external service provider external to the vehicle;
wherein said tire pressure monitoring system is operable to detect or determine or estimate a tire pressure in a tire mounted on a wheel of the vehicle and to communicate an output signal indicative of the tire pressure to said external service provider, said external service provider receiving the output signal from said tire pressure monitoring system and processing the output signal and communicating an alert to the subject vehicle to alert the driver or occupant of the vehicle of a tire pressure condition; and
wherein said external service provider communicates the alert to the vehicle via a wireless transmission of a control signal to the vehicle, said wireless control signal being operable to control an alert device in the vehicle, wherein said alert device comprises a visual alert at a display viewable by the driver of the vehicle, wherein said display comprises at least one laser diode operable to emit radiation, said at least one laser diode being rastered over a display area to provide a viewable display that is viewable and discernible by the driver of the vehicle, wherein said at least one laser diode is positioned within a mirror casing of an interior rearview mirror assembly and behind a transflective reflective element of the interior rearview mirror assembly, said at least one laser diode being operable to emit radiation onto a reflector within the mirror casing that reflects the radiation toward and through the reflective element for viewing by the driver of the vehicle.

12. The tire pressure alert system of claim 1, wherein said tire pressure monitoring system is operable to communicate tire pressure data to said external service provider.

13. The tire pressure alert system of claim 12 including a display viewable by the driver of the vehicle, wherein said display displays one of a numerical display of the tire pressure condition and an iconistic display of the tire pressure condition.

14. A tire pressure alert system suitable for use in a vehicle, said tire pressure alert system comprising:
a vehicular tire pressure monitoring system;
a telematic system of the vehicle operable to wirelessly communicate between the vehicle and an external service provider external to the vehicle;
said tire pressure monitoring system being operable to detect or determine or estimate a first tire pressure in a first tire mounted on a first wheel of the vehicle, a second tire pressure in a second tire mounted on a second wheel of the vehicle, a third tire pressure in a third tire mounted on a third wheel of the vehicle, and a fourth tire pressure in a fourth tire mounted on a fourth wheel of the vehicle, said tire pressure monitoring system being operable to communicate an output signal indicative of the first, second, third and fourth tire pressures to said external service provider, said external service provider receiving the output signal from said tire pressure monitoring system and processing the output signal and communicating an alert to the subject vehicle to alert the driver or occupant of the vehicle of a tire pressure condition;
an interior rearview mirror assembly having a transflective reflective element; and
a display element disposed behind said transflective reflective element and responsive to said alert and operable to emit visible alert information toward and through said transflective reflective element for viewing by the driver of the vehicle.

15. The tire pressure alert system of claim 14, wherein said tire pressure monitoring system includes first, second, third and fourth tire pressure sensors at respective ones of the first, second, third and fourth tires, said tire pressure monitoring system including a control operable to receive sensor output signals from said first, second, third and fourth tire pressure sensors and to communicate the output signal to said external service provider, the sensor output signal being indicative of the first, second, third and fourth tire pressures.

16. The tire pressure alert system of claim 15, wherein said control communicates the output signal to said external service provider when a communication link is established between the vehicle and the external service provider, said communication link being established at least one of (a) when a user actuates the telematic system via actuating a user input or button in the vehicle, and (b) when the ignition of the vehicle is started.

17. The tire pressure alert system of claim 14, wherein said external service provider communicates the alert to the vehicle via at least one of (a) a voice communication from the external service provider to the vehicle, and (b) a wireless transmission of a control signal to the vehicle.

18. The tire pressure alert system of claim 14, wherein said external service provider communicates the alert to the vehicle via a wireless transmission of a control signal to the vehicle, said wireless control signal being operable to control an alert device, said alert device comprising at least one of an audible alert device and a visual alert device.

19. The tire pressure alert system of claim 18, wherein said alert device comprises a visual alert at said display element viewable by the driver of the vehicle.

20. The tire pressure alert system of claim 19, wherein said display comprises at least one laser diode operable to emit radiation, said at least one laser diode being rastered over a display area to provide a viewable display that is viewable and discernible by the driver of the vehicle.

21. A tire pressure alert system suitable for use in a vehicle, said tire pressure alert system comprising:
a vehicular tire pressure monitoring system;

a telematic system of the vehicle operable to wirelessly communicate between the vehicle and an external service provider external to the vehicle;

said tire pressure monitoring system being operable to detect or determine or estimate a first tire pressure in a first tire mounted on a first wheel of the vehicle, a second tire pressure in a second tire mounted on a second wheel of the vehicle, a third tire pressure in a third tire mounted on a third wheel of the vehicle, and a fourth tire pressure in a fourth tire mounted on a fourth wheel of the vehicle, said tire pressure monitoring system being operable to communicate an output signal indicative of the first, second, third and fourth tire pressures to said external service provider, said external service provider receiving the output signal from said tire pressure monitoring system and processing the output signal and communicating an alert to the subject vehicle to alert the driver or occupant of the vehicle of a tire pressure condition; and wherein said external service provider communicates the alert to the vehicle via a wireless transmission of a control signal to the vehicle, said wireless control signal being operable to control an alert device, said alert device comprising at least one of an audible alert device and a visual alert device, wherein said alert device comprises a visual alert at a display viewable by the driver of the vehicle, wherein said display comprises at least one laser diode operable to emit radiation, said at least one laser diode being rastered over a display area to provide a viewable display that is viewable and discernible by the driver of the vehicle, wherein said at least one laser diode is positioned within a mirror casing of an interior rearview mirror assembly and behind a transflective reflective element of the interior rearview mirror assembly, said at least one laser diode being operable to emit radiation onto a reflector within the mirror casing that reflects the radiation toward and through the reflective element for viewing by the driver of the vehicle.

22. A tire pressure alert system suitable for use in a vehicle, said tire pressure alert system comprising:

an interior rearview mirror assembly having a transflective reflective element;

a vehicular tire pressure monitoring system;

a telematic system of the vehicle operable to wirelessly communicate between the vehicle and an external service provider external to the vehicle;

a visual alert device operable to display a visible alert that is viewable by a driver of the vehicle, said visual alert device disposed behind said transflective reflective element and operable to emit visible alert information toward and through said transflective reflective element for viewing by the driver of the vehicle; and wherein said tire pressure monitoring system is operable to detect or determine or estimate a tire pressure in a tire mounted on a wheel of the vehicle and to communicate an output signal indicative of the tire pressure to said external service provider, said external service provider receiving the output signal from said tire pressure monitoring system and processing the output signal and communicating an alert signal to the vehicle, whereby said visual alert device is operable to alert the driver or occupant of the vehicle of a tire pressure condition.

23. The tire pressure alert system of claim 22, wherein said tire pressure monitoring system includes a tire pressure sensor at each of at least two tires mounted on respective wheels of the vehicle, said tire pressure monitoring system including a control operable to receive signals from said tire pressure sensors and to communicate the output signal to said external service provider, said control communicating the output signal to said external service provider when a communication link is established between the vehicle and the external service provider.

24. The tire pressure alert system of claim 23, wherein said communication link is established at least one of (a) when a user actuates the telematic system via actuating a user input or button in the vehicle, and (b) when the ignition of the vehicle is started.

25. The tire pressure alert system of claim 22, wherein said visual alert device is incorporated in an interior rearview mirror assembly of the vehicle, said visible display being viewable by the driver of the vehicle through a mirror reflective element of the interior rearview mirror assembly.

26. The tire pressure alert system of claim 25, wherein said visual alert device comprises at least one laser diode operable to emit radiation, said at least one laser diode being rastered over a display area to provide a viewable display that is viewable and discernible by the driver of the vehicle.

27. A tire pressure alert system suitable for use in a vehicle, said tire pressure alert system comprising:

a vehicular tire pressure monitoring system;

a telematic system of the vehicle operable to wirelessly communicate between the vehicle and an external service provider external to the vehicle;

a visual alert device operable to display a visible alert that is viewable by a driver of the vehicle;

wherein said tire pressure monitoring system is operable to detect or determine or estimate a tire pressure in a tire mounted on a wheel of the vehicle and to communicate an output signal indicative of the tire pressure to said external service provider, said external service provider receiving the output signal from said tire pressure monitoring system and processing the output signal and communicating an alert signal to the vehicle, whereby said visual alert device is operable to alert the driver or occupant of the vehicle of a tire pressure condition; and wherein said visual alert device is incorporated in an interior rearview mirror assembly of the vehicle, said visible display being viewable by the driver of the vehicle through a mirror reflective element of the interior rearview mirror assembly, wherein said visual alert device comprises at least one laser diode operable to emit radiation, said at least one laser diode being rastered over a display area to provide a viewable display that is viewable and discernible by the driver of the vehicle, wherein said at least one laser diode is positioned within a mirror casing of the interior rearview mirror assembly and behind a transflective reflective element of the interior rearview mirror assembly, said at least one laser diode being operable to emit radiation onto a reflector within the mirror casing that reflects the radiation toward and through the reflective element for viewing by the driver of the vehicle.

* * * * *

UNITED STATES PATENT AND TRADEMARK OFFICE
CERTIFICATE OF CORRECTION

PATENT NO. : 7,423,522 B2  Page 1 of 1
APPLICATION NO. : 11/232324
DATED : September 9, 2008
INVENTOR(S) : Frank O'Brien, Niall R. Lynam and Kenneth Schofield It is certified that error appears in the above-identified patent and that said Letters Patent is hereby corrected as shown below:

Column 3:
Line 13, "fire" should be --tire--.

Column 4:
Line 57, "fire" should be --tire--.
Line 59, "estimates" should be --estimate--.

Column 7:
Line 57, "fire" should be --tire--.

Column 8:
Line 11, "fire" should be --tire--.

Column 25:
Line 57, "Wåahlström" should be --Wåhlström--.
Line 58, "DETECT-ION" should be --DETECTION--.

Signed and Sealed this

Twenty-second Day of December, 2009

David J. Kappos
*Director of the United States Patent and Trademark Office*